(12) United States Patent
Hinrikus et al.

(10) Patent No.: US 9,807,578 B2
(45) Date of Patent: *Oct. 31, 2017

(54) DUAL-MODE DEVICE FOR VOICE COMMUNICATION

(71) Applicant: Skype, Dublin (IE)

(72) Inventors: Taavet Hinrikus, Tallinn (EE); Gareth O'Loughlin, London (GB); Liz Rice, Enfield (GB); Max Melchior, Vancouver (CA)

(73) Assignee: Skype, Dublin (IE)

( * ) Notice: Subject to any disclaimer, the term of this patent is extended or adjusted under 35 U.S.C. 154(b) by 104 days.

This patent is subject to a terminal disclaimer.

(21) Appl. No.: 14/141,696

(22) Filed: Dec. 27, 2013

(65) Prior Publication Data

US 2014/0112207 A1 Apr. 24, 2014

Related U.S. Application Data

(63) Continuation of application No. 13/275,132, filed on Oct. 17, 2011, now Pat. No. 8,619,738, which is a
(Continued)

(51) Int. Cl.
*H04B 1/38* (2015.01)
*H04W 4/16* (2009.01)
(Continued)

(52) U.S. Cl.
CPC .............. *H04W 4/16* (2013.01); *G06F 1/169* (2013.01); *G06F 3/03547* (2013.01);
(Continued)

(58) Field of Classification Search
CPC ............... H04L 29/06027; H04L 69/16; H04L 25/0204; H04L 65/1023; H04M 7/0075; H04M 7/006; H04M 7/128; H04M 15/00; H04M 15/57; H04M 15/63; H04M 2203/1091; H04M 2215/208;
(Continued)

(56) References Cited

U.S. PATENT DOCUMENTS 7,860,071 B2  12/2010  Hinrikus et al.
7,912,448 B2   3/2011  Hinrikus et al.
(Continued)

FOREIGN PATENT DOCUMENTS

CN   101523860     7/2012
WO   WO-2005009019  1/2005

OTHER PUBLICATIONS

"802.11g SIP DECT VoIP Router—Data Sheet", Retrieved From; http://www.jalercom.com/cms/upload/products/planet/VIP-462DG/VIP-462DG.pdf, 2005, 2 pages.
(Continued)

*Primary Examiner* — Shaima Q Aminzay

(57) ABSTRACT

A terminal for use in a voice communications system includes a base station and at least one handset arranged to communicate wirelessly with the base station. The base station includes a first interface to a packet data network and a second interface to a public switched telephone network, the base station being arranged to selectively establish a packet data call from the first interface and a public switched telephone call from the second interface.

17 Claims, 27 Drawing Sheets

Related U.S. Application Data continuation of application No. 12/949,348, filed on Nov. 18, 2010, now Pat. No. 8,064,423, which is a continuation of application No. 11/515,402, filed on Aug. 31, 2006, now Pat. No. 7,860,071.

(51) Int. Cl.
| | |
|---|---|
| *G06F 1/16* | (2006.01) |
| *G06F 3/0485* | (2013.01) |
| *G06F 3/0488* | (2013.01) |
| *G06F 3/0354* | (2013.01) |

(52) U.S. Cl.
CPC ........ *G06F 3/0485* (2013.01); *G06F 3/04883* (2013.01); *G06F 2203/0339* (2013.01)

(58) Field of Classification Search
CPC ......... H04M 3/42042; H04M 3/42068; H04M 3/42102; H04M 3/42314; H04M 7/009
USPC ....... 370/338, 252, 352, 357, 428, 463, 493; 455/566, 557, 552.1, 553.1; 379/88.13, 379/93.09
See application file for complete search history.

(56) References Cited

U.S. PATENT DOCUMENTS

| | | | |
|---|---|---|---|
| 8,064,423 | B2 | 11/2011 | Hinrikus et al. |
| 8,090,396 | B2 | 1/2012 | Brown et al. |
| 8,285,336 | B2 | 10/2012 | Hinrikus |
| 8,619,738 | B2 | 12/2013 | Hinrikus et al. |
| 2001/0046224 | A1 | 11/2001 | Ryu |
| 2003/0072330 | A1 | 4/2003 | Yang et al. |
| 2004/0141484 | A1* | 7/2004 | Rogalski et al. ............. 370/338 |
| 2005/0064894 | A1 | 3/2005 | Kusnitz |
| 2005/0122965 | A1 | 6/2005 | Heinla et al. |
| 2006/0079280 | A1 | 4/2006 | LaPerch |
| 2007/0121561 | A1 | 5/2007 | Yashar et al. |
| 2007/0198432 | A1 | 8/2007 | Pitroda et al. |
| 2008/0056208 | A1 | 3/2008 | Hinrikus et al. |
| 2008/0059627 | A1* | 3/2008 | Hamalainen et al. ........ 709/224 |
| 2008/0076409 | A1 | 3/2008 | Hinrikus et al. |
| 2010/0167699 | A1 | 7/2010 | Sigmund et al. |
| 2011/0064028 | A1 | 3/2011 | Hinrikus et al. |
| 2011/0131358 | A1 | 6/2011 | Ganesh et al. |
| 2011/0158175 | A1 | 6/2011 | Hinrikus et al. |
| 2011/0208727 | A1 | 8/2011 | Jones et al. |
| 2012/0129518 | A1 | 5/2012 | Hinrikus |

OTHER PUBLICATIONS

Minar et al.,"A Network of Peers: Peer-to-Peer Models Through the History of the Internet", Peer to Peer: Harnessing the Power of Disruptive Technologies, 2001, 11 pages.
"Advisory Action", U.S. Appl. No. 11/515,402, dated May 6, 2010, 5 pages.
Baset et al.,"An Analysis of the Skype Peer-to-Peer Internet Telephony Protocol", Dept. of Computer Science, Columbia University, New York, NY,IEEE International Conference on Computer Communications; Proceedings, IEEE, XP-031072352, Apr. 1, 2006, 11 pages.
"Final Office Action", U.S. Appl. No. 11/515,402, dated Dec. 31, 2009, 20 pages.
"Final Office Action", U.S. Appl. No. 13/275,132, dated Nov. 19, 2012, 22 pages.
"Foreign Office Action", EP Application No. 07804090.4, dated Jun. 2, 2009, 4 pages.
"Foreign Office Action", EP Application No. 07804090.4, dated Dec. 12, 2009, 5 pages.
"International Search Report", International Application No. PCT/GB2007/003281, dated Dec. 19, 2007, 3 pages.
"Non Final Office Action", U.S. Appl. No. 11/515,402, dated Jun. 23, 2009, 11 pages.
"Non Final Office Action", U.S. Appl. No. 13/040,176, dated Oct. 24, 2011, 9 pages.
"Non-Final Office Action", U.S. Appl. No. 12/949,348, dated Mar. 29, 2011, 12 pages.
"Non-Final Office Action", U.S. Appl. No. 13/275,132, dated Jan. 22, 2013, 13 pages.
"Non-Final Office Action", U.S. Appl. No. 11/515,411, dated May 14, 2010, 13 pages.
"Non-Final Office Action", U.S. Appl. No. 13/275,132, dated Apr. 2, 2012, 5 pages.
"Notice of Allowance", U.S. Appl. No. 11/515,411, dated Nov. 29, 2010, 5 pages.
"Notice of Allowance", U.S. Appl. No. 13/040,176, dated Mar. 5, 2012, 5 pages.
"Notice of Allowance", U.S. Appl. No. 11/515,402, dated Aug. 25, 2010, 6 pages.
"Notice of Allowance", U.S. Appl. No. 11/515,402, dated Jun. 25, 2010, 7 pages.
"Notice of Allowance", U.S. Appl. No. 13/040,176, dated Jun. 6, 2012, 7 pages.
"Notice of Allowance", U.S. Appl. No. 13/275,132, dated Aug. 21, 2013, 8 pages.
"Notice of Allowance", U.S. Appl. No. 12/949,348, dated Sep. 12, 2011, 8 pages.
"Office Communication", U.S. Appl. No. 11/515,402, dated Sep. 24, 2010, 2 pages.
Singh et al.,"Peer-to-Peer Internet Telephony using SIP", Retrieved From: http://www1.cs.columbia.edu/~kns10/publication/nyman04.pdf, 2004, 6 pages.
"Planet VIP-462DG-DECT Fahiger VoIP Router", Retrieved From; http://www.openpr.de/pdf/68487/Planet-VIP-462DG-DECT-faehiger-VoIP-Router-kostenguenstig-ueber-das-Internet-oder-Festnetz-telefonieren.pdf, Nov. 16, 2005, 1 page.
"Restriction Requirement", U.S. Appl. No. 11/515,411, dated Mar. 11, 2010, 6 pages.
"Supplemental Notice of Allowance", U.S. Appl. No. 11/515,411, dated Jan. 5, 2011, 3 pages.
"Foreign Office Action", EP Application No. 14843127.3, dated Apr. 19, 2017, 6 pages.
"Foreign Office Action", EP Application No. 07804090.4, dated Nov. 24, 2016, 4 pages.
"Foreign Office Action", EP Application No. 07804090.4, dated Apr. 19, 2017, 6 pages.

\* cited by examiner

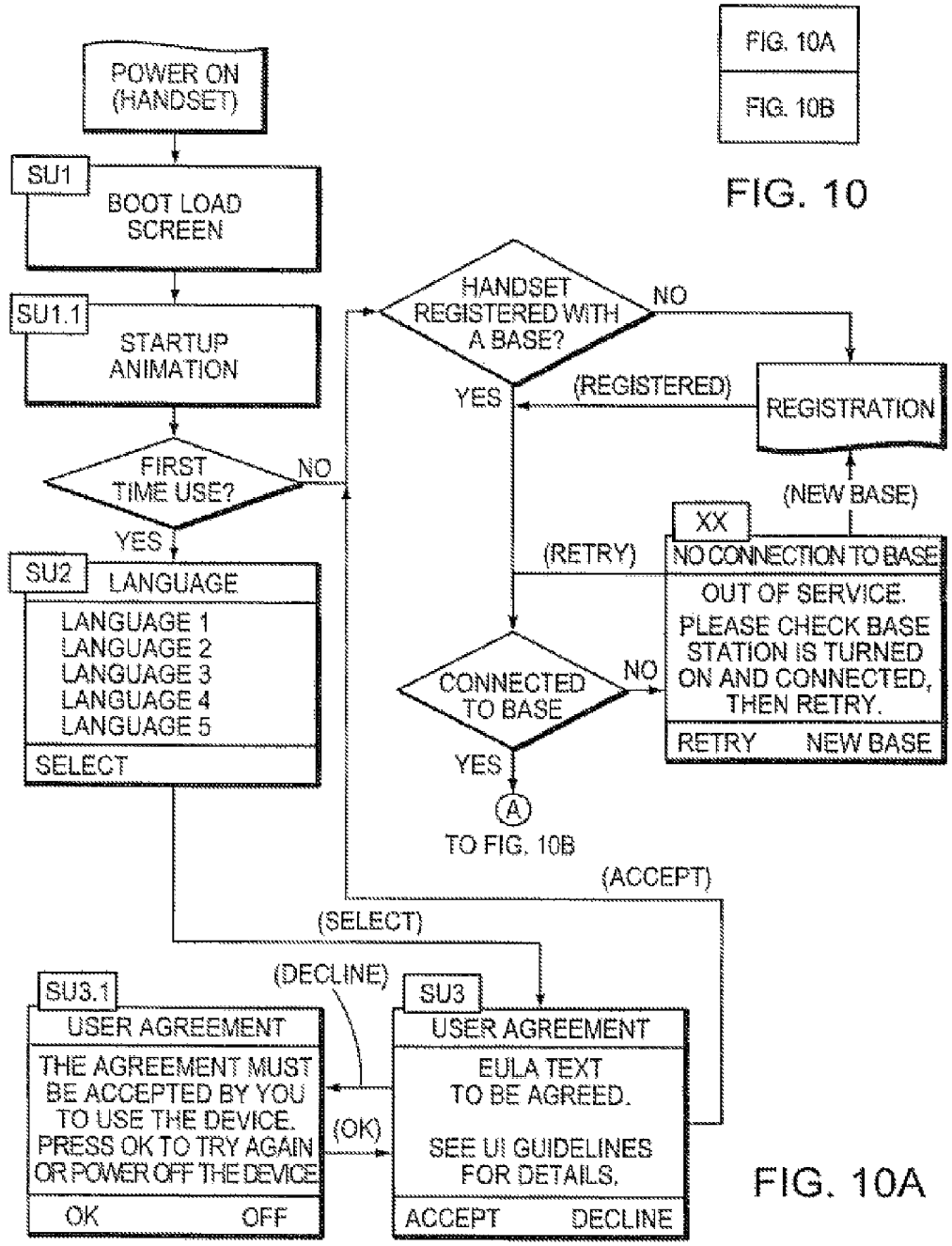

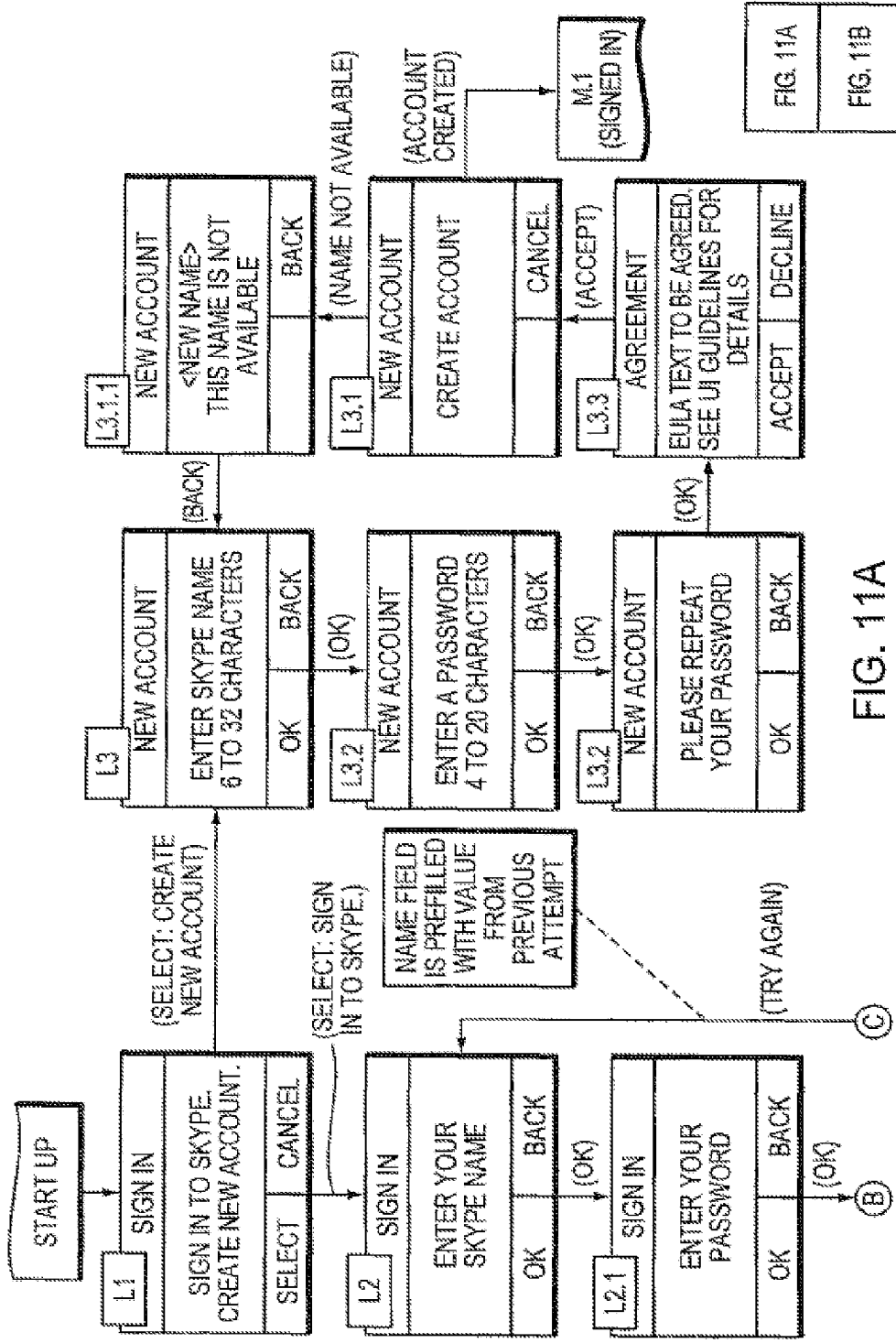

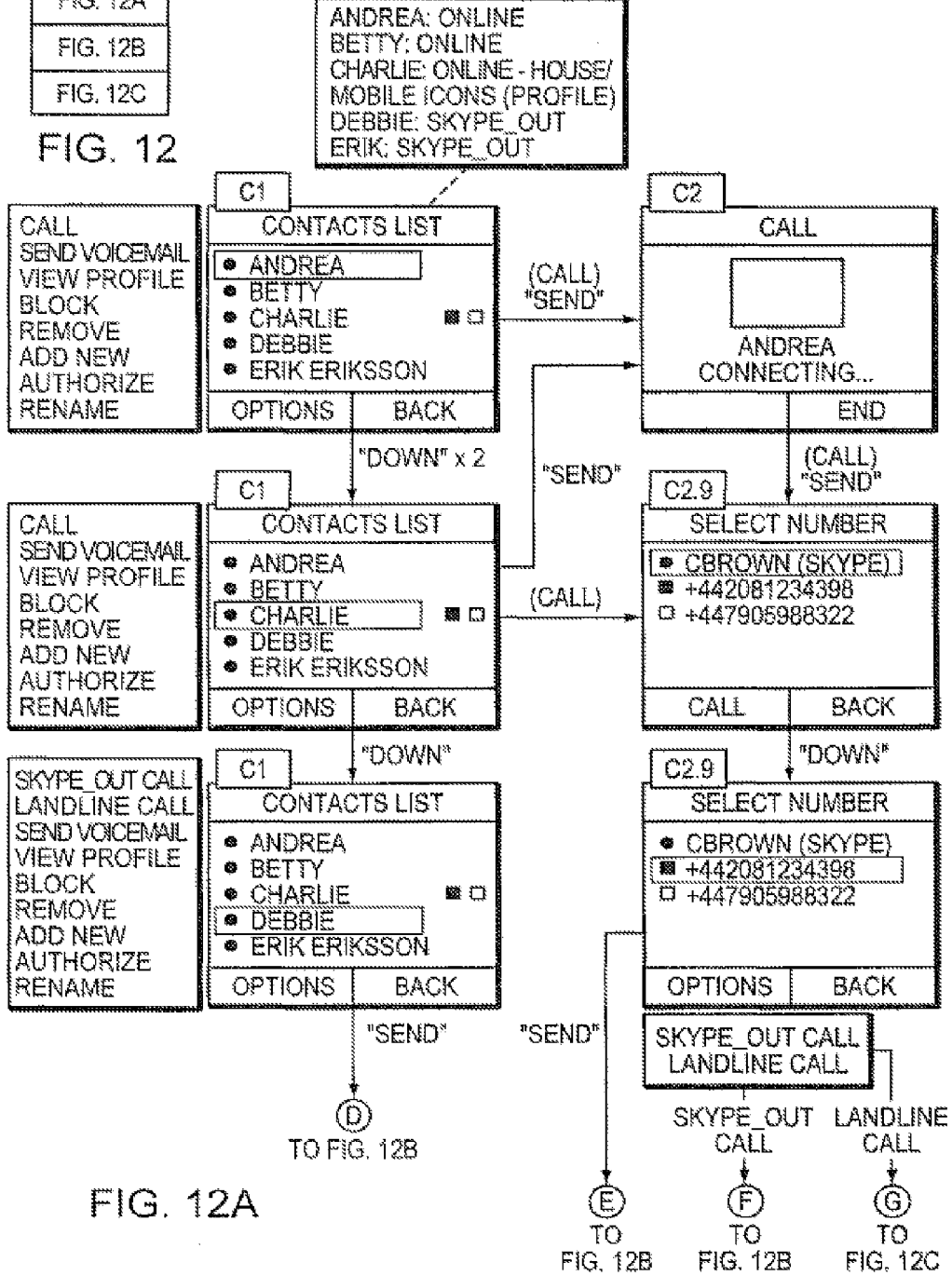

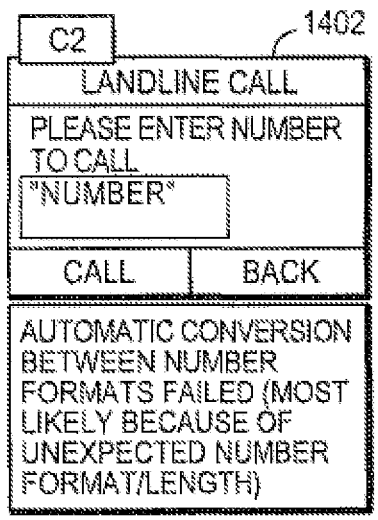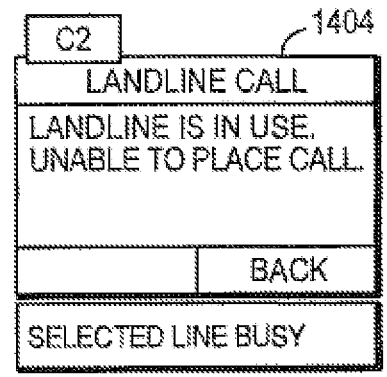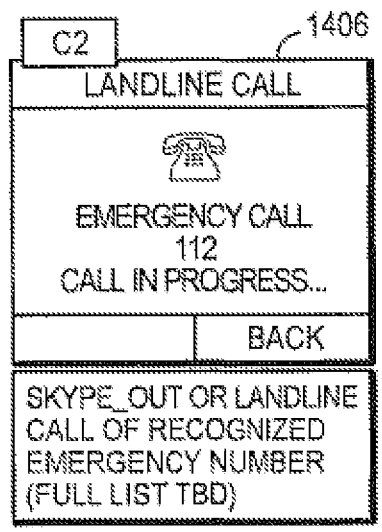
FIG. 14

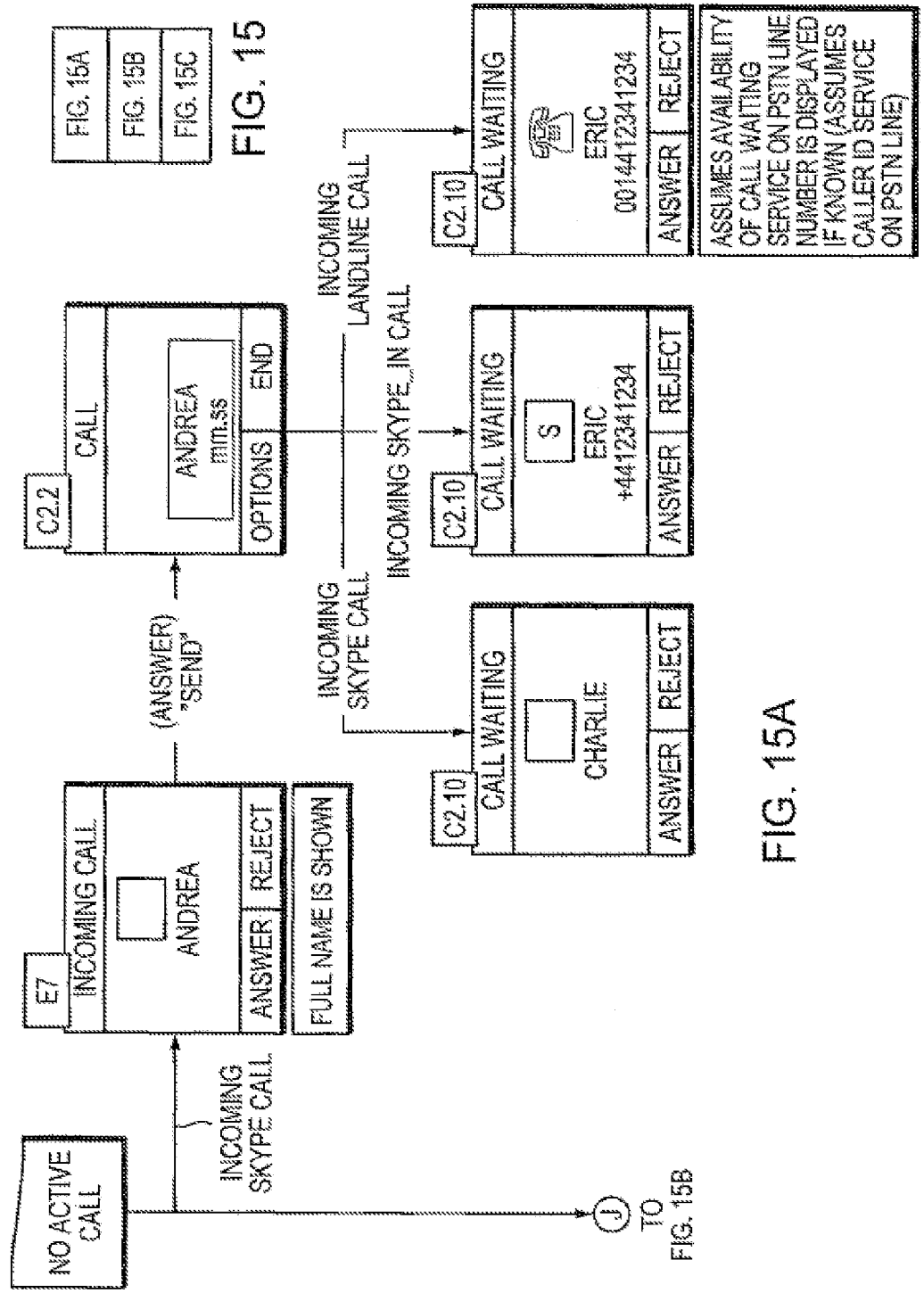

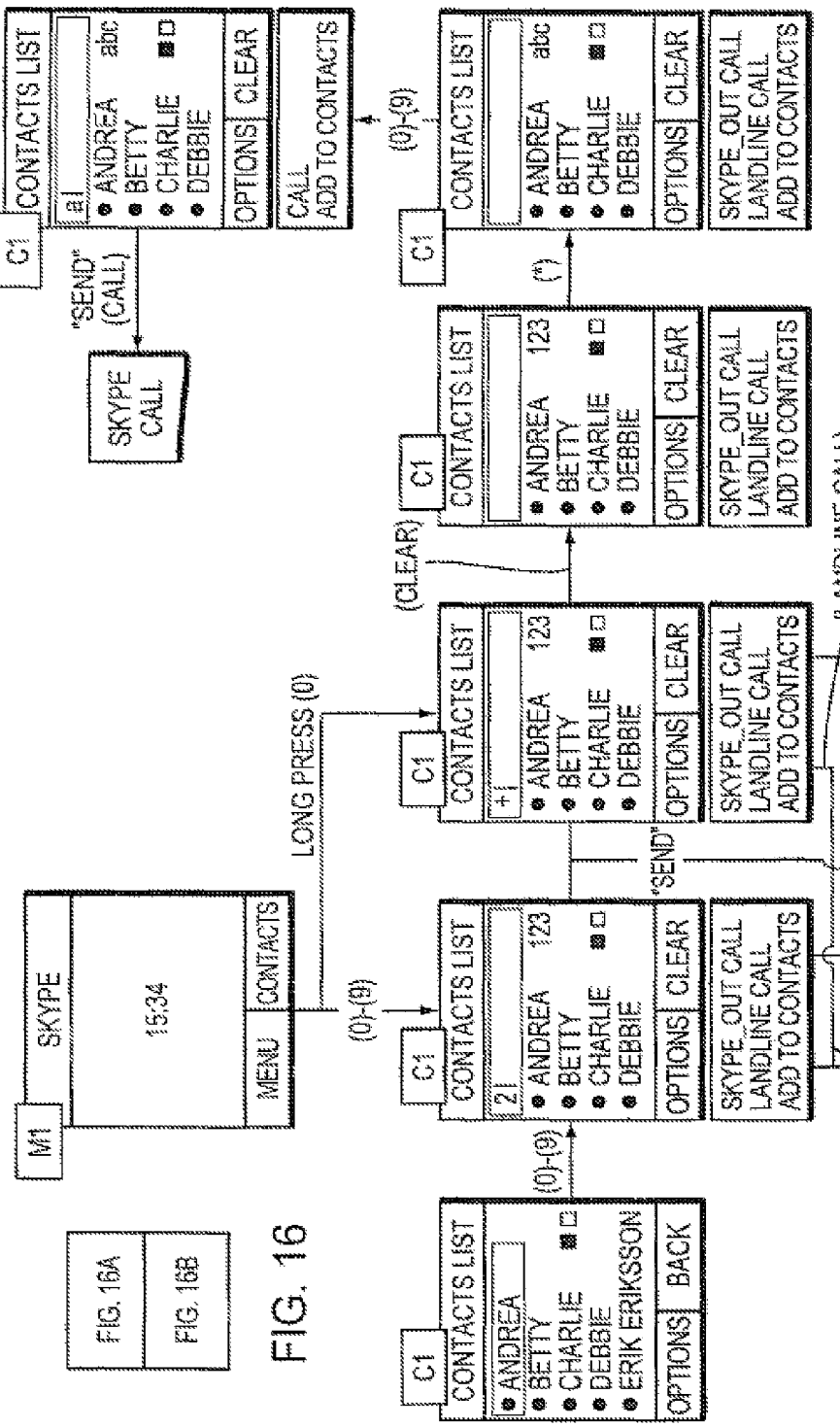

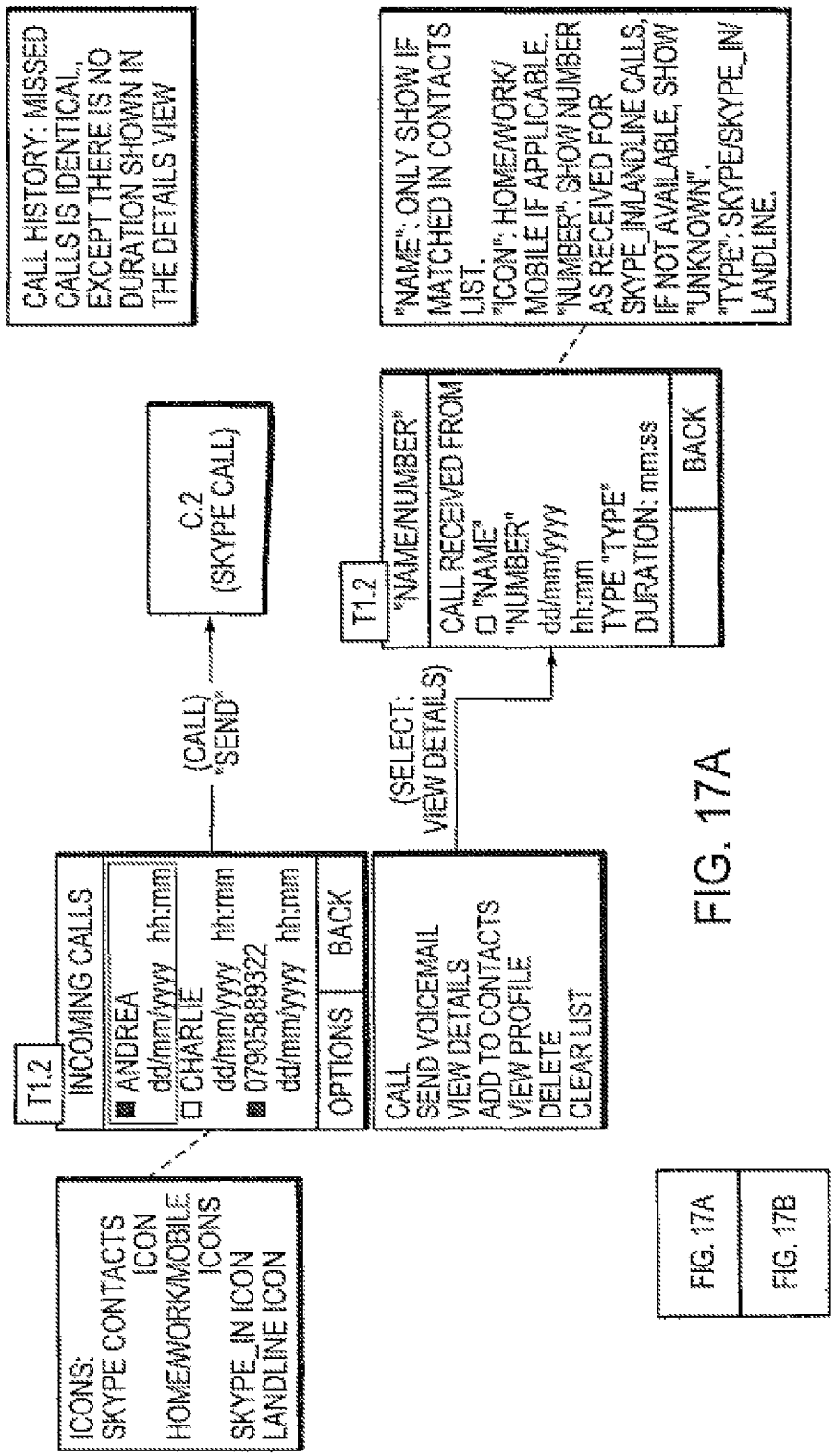

|FIG. 18A|
|FIG. 18B|

FIG. 18

T1.3 OUTGOING CALLS
- ■ DEBBIE dd/mm/yyyy hh:mm
- ☐ CHARLIE dd/mm/yyyy hh:mm
- ■ 02076543993 dd/mm/yyyy hh:mm

OPTIONS | BACK

ICONS:
SKYPE CONTACTS ICON
HOME/WORK/MOBILE ICONS
SKYPE_IN ICON
LANDLINE ICON

CALL
SEND VOICEMAIL
VIEW DETAILS
ADD TO CONTACTS
VIEW PROFILE
DELETE
CLEAR LIST (CALL) "SEND" → C.2 (SKYPE CALL)

(SELECT: VIEW DETAILS) →

T1.3.1 "NAME/NUMBER"
CALL MADE TO:
☐ "NAME"
"NUMBER"
dd/mm/yyyy
hh:mm
TYPE "TYPE"
DURATION: mm:ss

BACK

"NAME": ONLY SHOW IF MATCHED IN CONTACTS LIST.
"ICON": HOME/WORK/MOBILE (IF APPLICABLE).
"NUMBER": SHOW NUMBER AS CALLED FOR SKYPE_IN/LANDLINE CALLS. IF NOT AVAILABLE, SHOW "UNKNOWN".
"TYPE": SKYPE/SKYPE_IN/LANDLINE.

FIG. 18A

DUAL-MODE DEVICE FOR VOICE COMMUNICATION

RELATED APPLICATIONS

This application is a continuation of U.S. application Ser. No. 13/275,132, filed Oct. 17, 2011 which is a continuation of U.S. application Ser. No. 12/949,348, filed Nov. 18, 2010 which is a continuation of U.S. application Ser. No. 11/515,402 filed Aug. 31, 2006. The entire teachings of the above applications are incorporated herein by reference.

BACKGROUND

Peer-to-peer ("P2P") communication systems allow the user of a personal computer ("PC"), to engage in voice communication (calls) across a computer network such as the Internet. These systems are beneficial to the user as they are often of significantly lower cost than traditional telephony networks, such as fixed line or mobile cellular networks. This may particularly be the case for long distance calls. These systems utilize voice over internet protocol ("VoIP") over an existing network (e.g. the Internet) to provide these services, although alternative protocols can also be used. To use a peer-to-peer call service, the user must install and execute client software on their PC. The client software provides the VoIP connections as well as other functions such as registration and authentication. A call may be made using VoIP in accordance with methods known in the art, such as disclosed in WO 2005/009019.

Some calls in a peer-to-peer communication service may be free to the user, such as calls to other users of the same peer-to-peer service. There are therefore significant advantages to the user of the P2P communication service compared to traditional fixed or mobile services. However, the user is constrained by the fact that, in order to make or receive calls using a P2P communication service, they must have access to a PC. Even if the user does have access to a PC, the user must first switch on the PC before making a call, and consequently wait for it to boot up before the call can be made. Additionally, if the user wishes to receive incoming calls, they must leave the PC switched on, as otherwise calls cannot be received. This has the disadvantage of being inefficient from an energy consumption perspective.

Users may also be accustomed to mobility whilst using conventional telephony services, due to the prevalence of cordless phones and mobile cellular networks. With P2P communication services, however, the user's location is restricted to the area directly around the PC running the P2P client software.

Furthermore, P2P communication services cannot currently be used to call emergency numbers (for example 911 in the US, 999 in the UK and 112 in the EU). As a result of this, P2P communication services cannot be used as a replacement for conventional telephony services, as the user must be able to contact emergency services.

SUMMARY

In one or more embodiments there is provided a terminal for use in a peer-to-peer voice communications system comprising: a base station; and at least one handset arranged to communicate wirelessly with said base station; wherein the base station comprises a first interface to a packet data network and a second 25 interface to a public switched telephone network, said base station being arranged to selectively establish a packet data call from said first interface and a public switched telephone call from said second interface.

In one or more embodiments, the packet data call comprises voice over internet protocol (VoIP) packets.

In one or more embodiments, the base station further comprises a switching device operable to direct a voice communication signal to either said first interface or said second interface, responsive to a selection by said base station. The selection may be based on preferences of a user and the characteristics of the call being established.

In one or more embodiments, said base station further comprises a microprocessor arranged to execute embedded client software, wherein the client software is arranged to establish said packet data call, encode speech information as packet data for transmission from said first interface, and decode speech information from packet data received at said first interface.

In one or more embodiments, said at least one handset comprises: a display; and a keyboard comprising multifunctional keys capable of entering numeric or alphabetic characters depending on a number of key presses, said keyboard being arranged to enter contact information into a user interface displayed on said display, select contacts on the user interface, and initiate a voice call with a contact.

In one or more embodiments, the user interface further displays presence information for the contacts, said presence information indicating the current status of the contact.

In one or more embodiments, said at least one base station further comprises a storage device for storing contact information, whereby, upon activation of the terminal, the contact information is transmitted to the base station from a contact server connected to said packet data network and stored in said storage device.

In one or more embodiments, the user interface further displays a contact search interface, whereby information is entered into the contact search interface using the keyboard and transmitted to said base station, and, in response thereto, the base station is arranged to create a contact search request that is transmitted to the peer-to-peer voice communications system from said first interface.

In one or more embodiments, in response to the contact search request, a contact search response is received by said terminal, said contact search response being displayed on said user interface.

In one or more embodiments, a packet data call may be established with a contact displayed in said contact search response. In another embodiment, a contact displayed in said contact search response may be stored in the handset.

In one or more embodiments there is provided a peer-to-peer voice communications system comprising: a terminal comprising a base station and at least one handset arranged to communicate wirelessly with said base station, wherein the base station comprises a first interface to a packet data network and a second interface to a public switched telephone network, said base station being arranged to selectively establish a packet data call from said first interface and a public switched telephone call from said second interface; and a network element connected to the packet data network and arranged to communicate with said terminal, wherein the network element transfers packets of said packet data call between said wireless handset and the network.

In one or more embodiments, the packet data call comprises voice over internet protocol (VoIP) packets.

In one or more embodiments, the peer-to-peer voice communications system further comprises a contact server connected to the network for storing the contact information for the terminal, wherein, upon activation of the terminal, the contact information is transmitted to the terminal via the network element and stored in said terminal.

In one or more embodiments there is provided a terminal for use in a peer-to-peer voice communications system comprising: a base station; and at least one handset arranged to communicate wirelessly with said base station; wherein the base station comprises a first means for interfacing to a packet data network and a second means for interfacing to a public switched telephone network, said base station being arranged to selectively establish a packet data call from said first means for interfacing and a public switched telephone call from said second means for interfacing.

In one or more embodiments, the base station further comprises a switching means operable to direct a voice communication signal to either said first means for interfacing or said second means for interfacing, responsive to a selection by said base station.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 14 shows screens that are displayed when exceptions to outgoing calls are raised;

DETAILED DESCRIPTION

A description of example embodiments follows.

Figure 1:
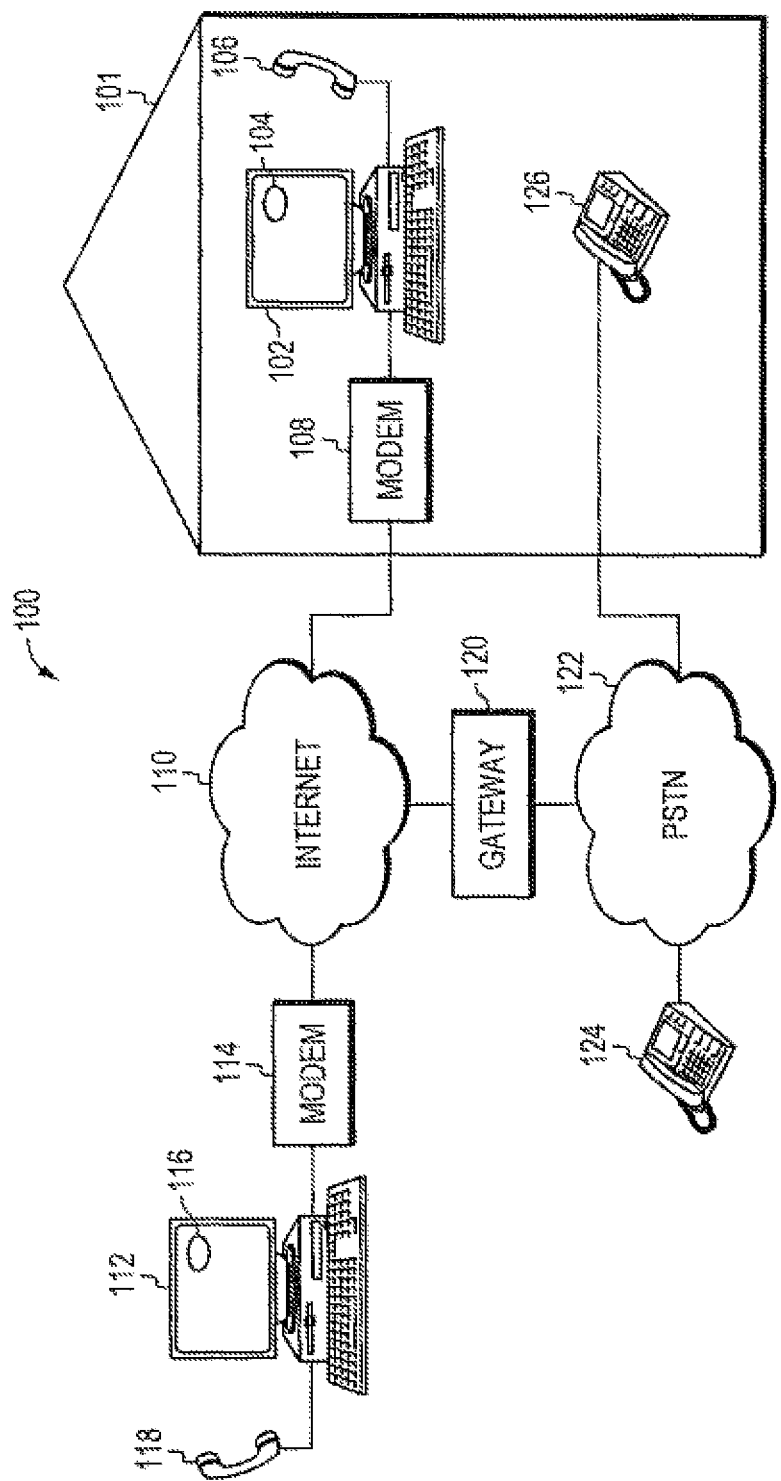
FIG. 1 shows a P2P communication system comprising a PC and a wired network connection.

Reference is first made to FIG. 1, which illustrates a known P2P communication system 100. FIG. 1 illustrates the household 101 of a user of the P2P communication service. The user operates a computer terminal 102, such as a PC, upon which is executed client software 104. Also connected to the PC is a handset 106, which comprises a speaker and microphone, to enable the user to listen and speak in a voice call in the same manner as with traditional fixed-line telephony. The handset 106 does not necessarily have to be in the form of a traditional telephone handset, but can be in the form of a headphone or earphone with an integrated microphone, or as a separate loudspeaker and microphone independently connected to the PC 102.

As mentioned, the computer terminal 102 is running a client 104, which is provided by the operator of the P2P communication service. The client 104 is a software program executed on a local processor in the computer terminal 102. To initiate a call, the user can click on a contact listed for another user displayed in the client 104, or can alternatively type in a username for the other user. The client 104 then sets up the call to the other user and the call can be made using VoIP. The client performs the encoding and decoding of VoIP packets.

The computer terminal 102 is connected to a modem 108, which allows the computer terminal to send data to, and receive data from, a network such as the Internet 110. In the example shown in FIG. 1, the computer terminal is connected to the modem 108 using a wired connection. The wired connection can be, for example, Ethernet or USB.

VoIP packets from the computer terminal 102 are transmitted into the Internet 110 via the modem 108, and routed to the computer terminal 112 of the other user via a modem 114. A client 116 (similar to the client 104) running on the computer terminal 112 of the other user decodes the VoIP packets to produce an audio signal that can be heard by the other user using the handset 118. Conversely, when the other user talks into handset 118, the client 116 executed on computer terminal 112 encodes the audio signals into VoIP packets and transmits them, via the modem 114, across the Internet 110 to the computer terminal 102. The client 104 executed on computer terminal 102 decodes the VoIP packets from the other user, and produces an audio signal that can be heard by the user of the handset 106.

Alternatively, the user of the computer terminal 102 can make a voice call to a user of a fixed-line telephone service. In this case, the user types in a telephone number of another user connected to the public switched telephone network ("PSTN") into the client 104. The client encodes the audio signals from the user as VoIP packets and these are transmitted into the Internet 110 via the modem 108. The VoIP packets are routed to a gateway 120 connected between the Internet 110 and the PSTN 122, where they are converted into a form suitable for transmission across the PSTN 122. The PSTN 122 delivers the converted voice information from the gateway 120 to the fixed-line telephone equipment 124 of the other user. Note that the user could also make calls to a 5 mobile telephone via a mobile network, instead of the PSTN (not illustrated in FIG. 1).

The above-described system suffers from the previously mentioned problems that, in order for the user to make or receive phone calls using the P2P communication service, the computer terminal 102 must be present and activated. If the computer terminal 102 is not activated, the user must first switch it on before making a call. Additionally, if there is an incoming call, for example from the fixed-line telephone 124 or the computer terminal 112, then the computer terminal 102 must be powered on in order to receive the call. Furthermore, the users are also constrained in their mobility whilst using the P2P communication service, due to the wired nature of the connections between the computer terminal 102 and the modem 108, and between the computer terminal 102 and the handset 106. In addition, as the P2P communication service cannot be used for emergency calls, the user must also have a conventional fixed-line telephone 126 in the house 101, with a direct connection to the PSTN 122. The user's fixed-line telephone 126 can be used to call other fixed-line telephones 124 over the PSTN 122, and may, if so enabled by the P2P communication service, be used to call terminals 112 of users of the P2P service.

Figure 2:
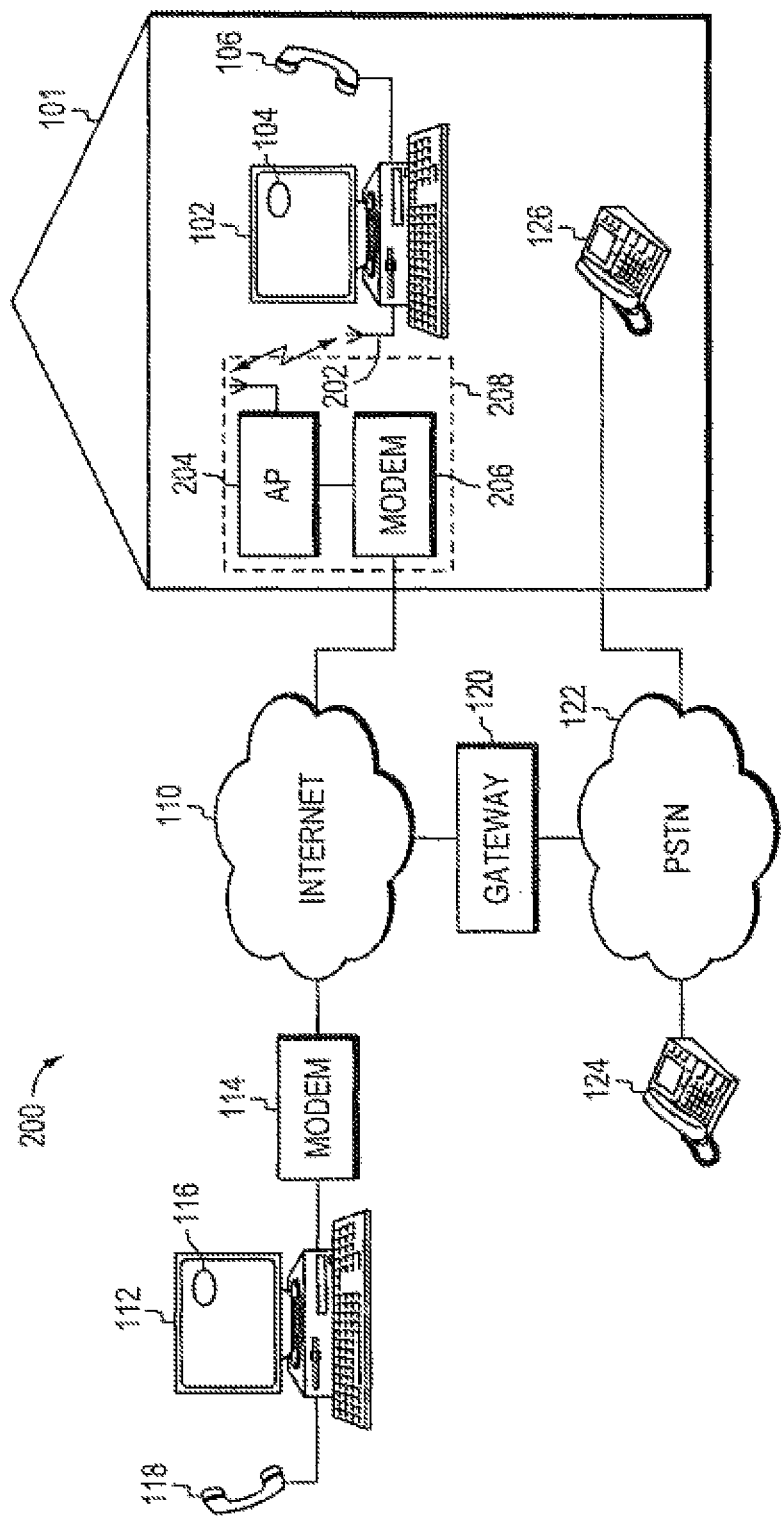
FIG. 2 shows a P2P communication system comprising a PC and a wireless network connection.

FIG. 2 shows an alternative known P2P communication system 200. The system 200 is identical to the system 100 shown in FIG. 1, except that the computer terminal 102 is connected to the Internet 110 via a wireless connection. The computer 25 terminal 102 has a wireless local area network ("WLAN") module with an antenna 202, which is able to transmit data wirelessly to a WLAN access point ("AP") 204. The AP 204 is connected a modem 206, which is in turn connected to the Internet 110. The wireless connection can use a WLAN standard such as the IEEE 802.11 family of standards (also known as WiFi). The AP 204 and the modem 206 can be integrated into a single device which may be referred to as a wireless modem or wireless router), as indicated by the dashed box 208. Alternatively, they can be separate devices.

The operation of the system 200 shown in FIG. 2 is the same as that shown in FIG. 1 and described above, except that the VoIP packets from the computer terminal 102 are sent to the modem 206 wirelessly, and, similarly, VoIP packets from other users are received at the computer terminal 102 wirelessly. This provides the user with a limited degree of mobility, particularly if the computer terminal is a laptop or notebook computer. However, the levels of mobility are still much lower than can be achieved with traditional cordless phones or mobile cellular phones. Furthermore, the fixed-line telephone 126 must also still be present to allow emergency calls to be made.

Figure 3:
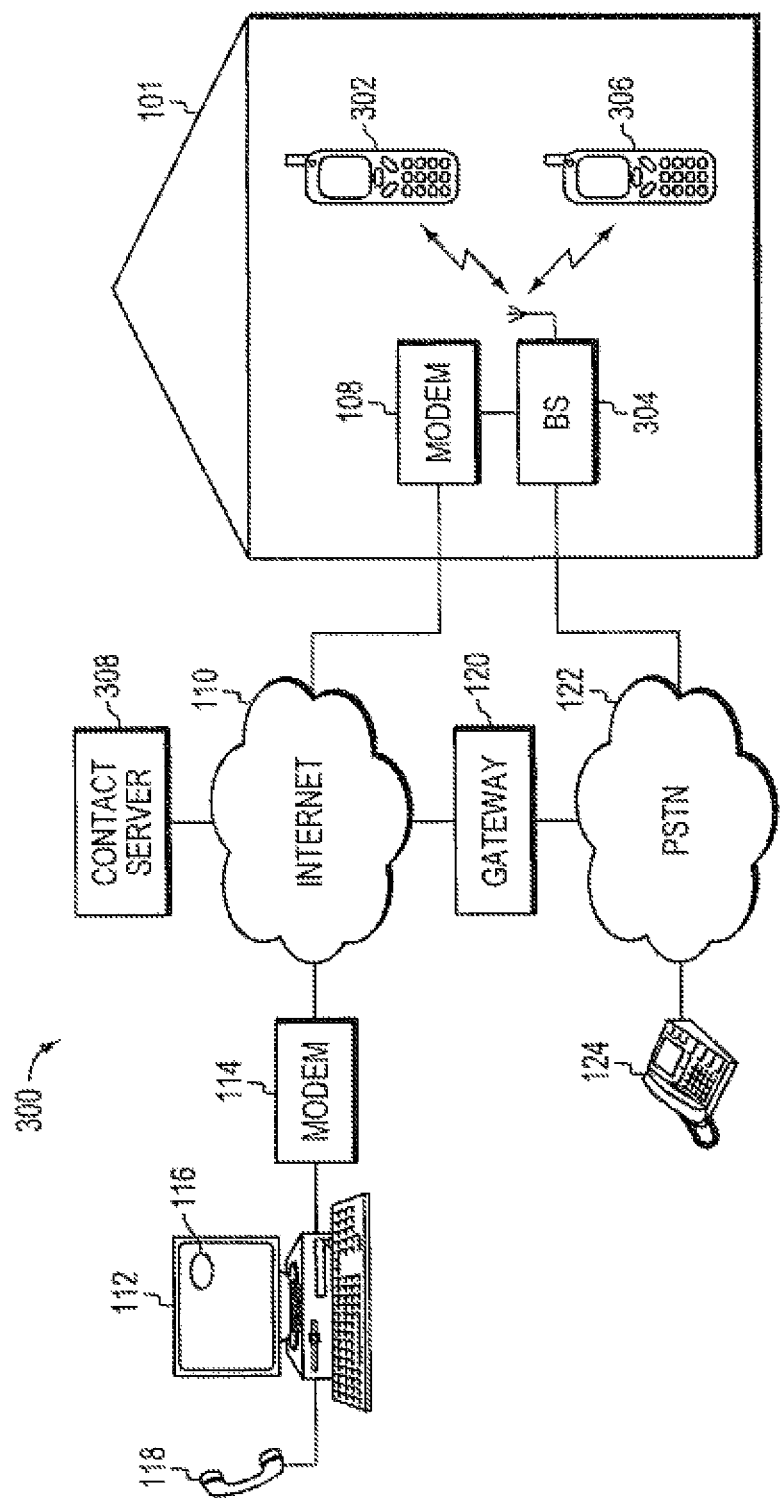
FIG. 3 shows a P2P communication system comprising a dual-mode terminal.

Reference is now made to FIG. 3, in which is illustrated a P2P communication system 300 comprising a dual-mode terminal according to one or more embodiments. The dual-mode terminal comprises a wireless handset 302 in communication with a base station ("BS") 304, which is able to make VoIP calls across the Internet without the need for a computer terminal and can also make conventional telephone calls directly across the PSTN.

As the wireless handset 302 is small and light enough to be hand-held, and a PC is not required, much greater levels of mobility can be achieved compared to a wireless laptop or notebook computer.

The wireless handset 302 connects to the base station 304 using a short range wireless communication protocol. In one or more embodiments, the wireless handset 302 connects to the BS 304 using the digital European cordless telecommunications ("DECT") standard. In alternative embodiments, the wireless handset 302 connects to the BS 304 using a different cordless telephone standard such as personal handyphone system ("PHS"), or using an alternative wireless standard such as Bluetooth, IEEE 802.11 ("Wi Fi"), ultra-wideband ("UWB") or any other suitable wireless communications protocol.

The BS 304 is connected to the modem 108, which allows the BS 304 to send and receive data from a network such as the Internet 110, and is also connected to the PSTN 122 to enable conventional telephone calls to be made and received. The BS 304 executes dedicated embedded client software to perform the same function as the client software 104 that was running on the computer terminal 102 in FIGS. 1 and 2. Therefore, by running embedded client software on the BS 304, VoIP calls can be made using the P2P communication service without the computer terminal 102 being present. Embedded software means that the software is permanently loaded onto the device and cannot be removed by the user. However, it is still possible for the embedded software to be upgraded or updated by the user. In addition, only approved versions of the same software can be upgraded or updated, and the user cannot load any other type of software onto the device. Note that, in some embodiments, the embedded software can be upgraded "silently" without the user knowing it is happening.

In addition, by also providing a direct connection to the PSTN 122, the calls can be made from the wireless handsets 302, via the BS 304 directly to the PSTN 122, thereby allowing emergency calls to be made and removing the need for a second fixed-line telephone.

Multiple wireless handsets, as indicated by the second wireless handset 306, may be in communication with the base station 304, allowing the user to have more than one handset available for use in the house 101. This provides a further advantage to the user, as the handsets indicate which (if any) of the two lines (P2P VoIP service or PSTN) are currently in use. If one of these lines are being used by a user of one handset (e.g. handset 302), a second user of a second handset (e.g. handset 306) can use the alternative line for making calls. Therefore, this provides the advantage that two separate calls can simultaneously be made over two lines into the household using multiple wireless handsets, whereas "this is not possible with conventional domestic fixed-line cordless telephones.

Figure 4:
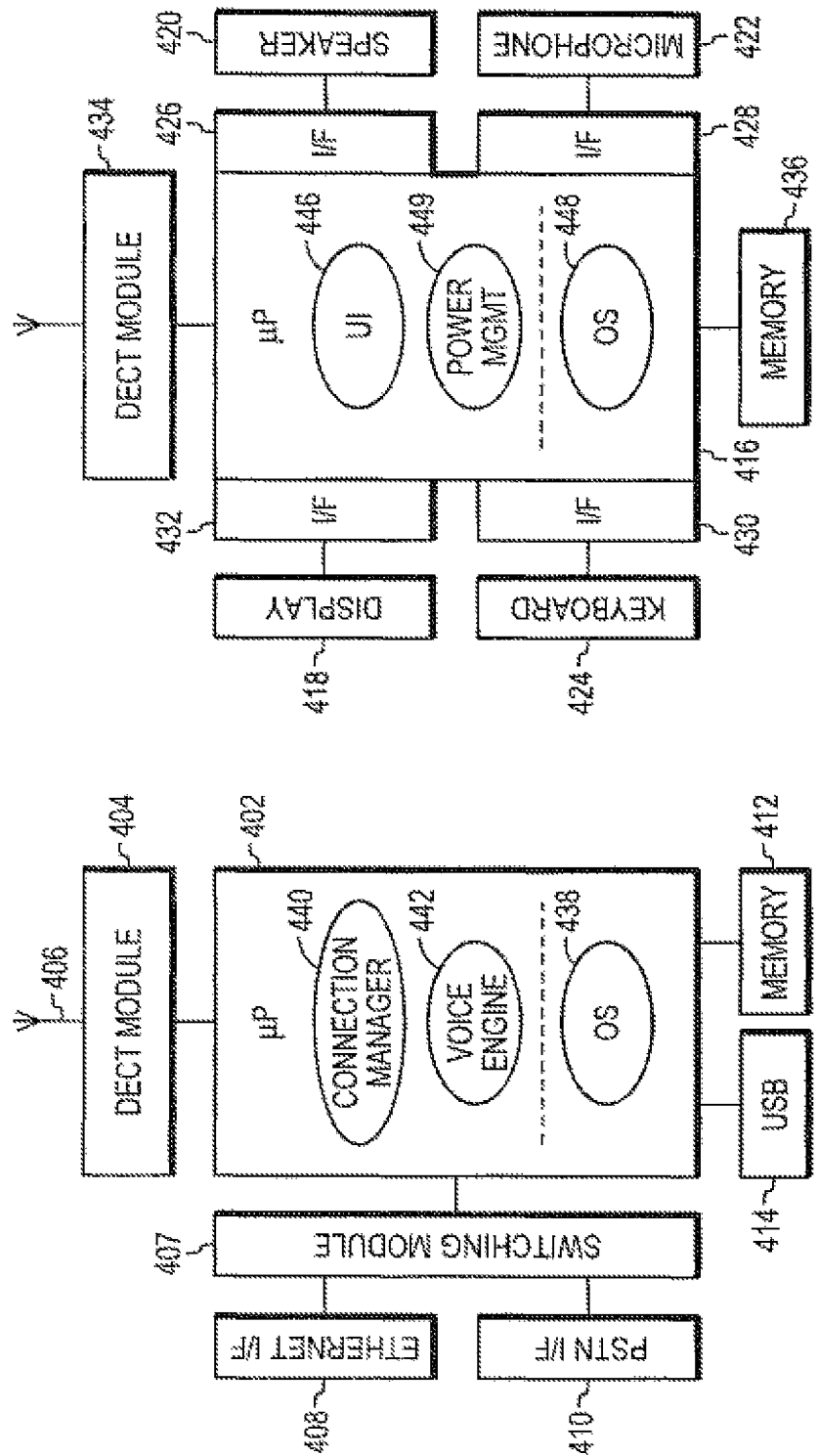
FIG. 4a shows the functional elements of a dual-mode terminal base station.
FIG. 4b shows the functional elements of a dual-mode terminal wireless handset.

Reference is now made to FIGS. 4A and 4B, which illustrate the main functional elements of the base station 304 (FIG. 4A) and wireless handset 302 (FIG. 4B).

The BS 304 shown in FIG. 4A comprises a microprocessor ("µP") 402 (also known a central processing unit ("CPU")), which controls the operation of the BS 304 and executes embedded software. A radio frequency ("RF") module is also connected to the microprocessor, which implements the particular radio communication standard used between the wireless handset 302 and the BS 304, such as a DECT module 404. The RF signals are transmitted and received from an antenna 406.

Connected to the microprocessor 402 is a switching module 407. The switching module operates under the control of the microprocessor 402 to direct the voice call to either the Internet via the modem 108 (in the case of a P2P VoIP call) or to the PSTN 122 (in the case of a PSTN call). Connected to the switching module 407 is an interface for connecting to the modem 108 (as shown in FIG. 3). In one or more embodiments, this interface is an Ethernet interface 408 that implements the Ethernet communication protocol. In alternative embodiments, other interfaces could also be used for communicating with the modem 108, such as the universal serial bus ("USB"). A PSTN interface 410 is connected to the microprocessor 402 for connecting the BS 304 to the PSTN 122. This interface allows the BS 304 to connect to the PSTN 122 in the same way as a conventional fixed-line telephone. The BS 304 and wireless handset 302 are still able to operate if either the PSTN or Ethernet interfaces are disconnected, in which case the alternative line is used for making calls.

Also connected to the microprocessor 402 is a memory 412 and an optional serial interface 414. The memory 412 can include both Flash and RAM. The serial interface 414 can be used in some embodiments for loading and updating software on the microprocessor 402. In one or more embodiments, the serial interface 414 is a USB interface. In alternative embodiments other serial interfaces could also be used, such as 25 the IEEE 1394 (Firewire) standard.

The wireless handset 302 shown in FIG. 4B comprises a microprocessor 416, which controls the operation of the wireless handset 302 and executes embedded software. Connected to the microprocessor 416 is a display 418 (such as a liquid crystal display ("LCD")), a speaker 420, a microphone 422 and a keyboard 424. The speaker 420 may be connected to the microprocessor 416 via an interface 426 which comprises audio driver hardware (including for example amplifiers) and a digital to analogue converter. The functionality of the interface 426 may alternatively be integrated into microprocessor. The microphone 422 is connected to the microprocessor 416 via an interface 428 comprising audio receiving hardware (such as amplifiers) and an analogue to digital converter. Again, this functionality may be integrated into the microprocessor 416. The keyboard 424 is connected to the microprocessor 416 via a keyboard encoder interface 430. The display 418 is connected to the microprocessor via a display driver interface 432. Also connected to the microprocessor is an RF module, such as a DECT module 434, for communicating wirelessly with the base station, and a memory 436, which can include both Flash and RAM.

Referring again to FIG. 4A, the microprocessor 402 of the BS 304 is operating within a small dedicated device, and therefore needs to be of a lower processing power than the CPU inside a PC. For example, the microprocessor 402 can typically have a clock speed of 200-400 MHz. In alternative embodiments, the microprocessor 402 can be complemented by a digital signal processor ("DSP"), which can perform some of the voice processing functions (described below). This allows the microprocessor 402 clock speed to be reduced, for example to 50-200 MHz.

The microprocessor 402 executes embedded software to allow the wireless handset 302 to be used to make VoIP calls (i.e. without the use of a PC). The microprocessor 402 executes an operating system ("OS") 438. In one or more embodiments, the OS 438 is Linux, although other operating systems could also be used. The OS 438 allows programs to be run on the microprocessor 402 and controls low-level operations such as an IP stack and file system support.

Running on the OS 438 of the microprocessor 402 is a connection manager 440. The connection manager 440 is the central component of the client software, and handles connections to the P2P communication network. This includes the placing of calls, managing online status, and any communication with other users. The connection manager also handles calls across the PSTN network.

The connection manager 440 determines whether a call should be routed via the Internet (as a P2P VoIP call) or via the PSTN (as a PSTN call). This decision may be based on a number of factors. For example, the user can set preferences as to whether the P2P service or PSTN connection is used to call particular types of contact. Alternatively, the wireless handset 302 may prompt the user to select which type of connection is to be used. In addition, some numbers (such as emergency numbers) can only be called using one type of network (e.g. the PSTN) and the connection manager detects this and routes the call automatically. The routing of the call is performed by the connection manager 440 sending a signal from the microprocessor to the switching module, which operates to direct the voice call signals to the appropriate interface for the type of call required.

Operating under the control of the connection manager 440 is a voice engine 442. The voice engine 442 incorporates the codec for encoding and decoding the voice information when making VoIP calls. In one or more embodiments, the codec is a G.729 codec. This is used as it can be run easily on a small dedicated device with a lower processing power than a PC. However, in alternative embodiments, any other suitable codec such as G.711, G.726 and wideband AMR-WB could also be used.

Apart from performing the encoding and decoding of voice information, the voice engine 442 also provides a jitter buffer, echo cancellation facilities, voice activity detection and comfort noise generation. The voice engine further implements the sending and receiving of real-time protocol ("RTP") packet streams, the generation of dual tone multi-frequency ("DTMF") tones, and the setting of output amplification (i.e. volume). Note that in some embodiments, there can be some voice engine functionality in the wireless handset 302, such as local echo cancellation.

Therefore, the embedded software in the BS 304 implements the same functionality as a VoIP client running on a PC, and allows both P2P calls and PSTN calls to be made using the combination of the BS 304 and the wireless handset 302. Whilst the BS 304 comprises the embedded software for making P2P and PSTN calls, the wireless handset comprises embedded software for interacting with the user and communicating with the BS 304, as described below.

The user of the wireless handset 302 interacts and controls the connection manager 440 in the BS 304 through a user interface ("UI") 446, which is running on an operating system 448 on the microprocessor 416 of the wireless handset 302. The wireless handset 302 also executes power management software 449 that is used to conserve the battery consumption of the wireless handset 302, for example by dimming the screen when the handset is not in use.

The UI 446 is specially adapted for display on the small screen of a handheld device, and is designed to be operated by a small keyboard (the structure of which will be described hereinafter). Through the UI 446 of the wireless handset 302, the user can use the P2P communication service with almost the same level of functionality as if they were using a PC 102 and a handset 106, as well as make PSTN calls, as will now be described.

A new user of the P2P communication service can use the wireless handset 302 to create an account and login to the P2P communication system. This involves the user entering information such as their name using the keyboard of the wireless handset 302, and selecting a username and password.

When a user has logged into the P2P communication service they can access their contact list on the UI of the wireless handset 302. The contact list is created by the user and is a list of people that the user can readily set up a call with. The contact list may comprise usernames of users of the P2P communication service and regular PSTN phone numbers. A single contact list is maintained both for calls that are made using the P2P service (via the Ethernet interface 408) and by the PSTN (via the PSTN interface 410). In the case of contacts of other users of the P2P communication service, these contacts have authorized the user to view their "presence" information in the contact list. The presence information is an indication of the online status of a particular user of the P2P communication service. For example, the user is able to see if a contact is online, offline, busy or away (other presence states are also possible). This information is shown next to the contact's name in the contact list. Presence information is not available for contacts that are not users of the P2P communication service. The contact list is stored in the memory 412 of the base station 304. In alternative embodiments, the contact list can also be cached locally on the wireless handset 302 in memory 436.

The user can set up a call to a contact in the contact list by, for example, simply selecting the appropriate contact using the keyboard (note that a call to a contact can be initiated using other methods, such as from a call history or typing a username). The user can set preferences as to whether the P2P service or PSTN connection is used to call particular types of contact. Alternatively, the wireless handset 302 may prompt the user to select which type of connection is to be used. Referring again to FIGS. 3 and 4, if a call is made to another user of the P2P communication service, the wireless handset 302 uses the DECT connection with the BS 304, transmitting the request to call the person listed in the contact list using the P2P service. The connection manager 440 in the BS 304 then sets up the call by transmitting data from the modem 108, across the Internet 110 to the destination computer terminal 112 running client 116 (via modem 114).

Once the call is established, the voice call can then proceed between the user of the wireless handset 302 and the user of handset 118. Speech signals from the user of the wireless handset 302 are received at the microphone 422 of the wireless handset 302 and passed to the microprocessor 416 via the interface 428. The speech signals are then processed such that they can be transmitted according to the DECT protocol. These signals are then transmitted to the base station 304 using the DECT module 434 of the wireless handset 302, and subsequently received by the DECT module 406 of the BS 304. The BS 304 decodes the DECT signals to extract the speech signals. The speech signals are encoded by the embedded voice engine 442 as VoIP packets, and transmitted via the Ethernet interface 408 to the modem 108 and subsequently across the Internet 110 to the destination computer terminal 112 running client 116 (via modem 114).

Speech signals originating from the destination computer are received as VoIP packets at the Ethernet interface 408 of the BS 304, and decoded by the voice engine 442. These are then processed by the microprocessor 402 for transmission using the DECT protocol, and transmitted by the DECT module 404. The DECT signals are received by the DECT module 434 of the wireless handset 302, and decoded by the microprocessor 416 to produce audio speech signals. The audio speech signals are provided to the speaker 420 of the wireless handset via the interface 426.

Similarly, an incoming call from another user of the P2P communication service may be received at the wireless handset 302. In this case the call is set up by the client 116 of the computer terminal 112. The call is received at the BS 304, which pages the wireless handset 302 over DECT, and the call is indicated to the user by a ring-tone, the vibration of the device, or a combination of these (depending on user preferences). The user is also displayed the identity of the caller on the UI, and, in some cases, a picture if this is available. The use of the BS 304 and wireless handset 302 has the advantage that the call can be received without a PC needing to be present or activated.

The user of the wireless handset can set up a call to a PSTN telephone user. A call to a PSTN user can either be made via the P2P communication service, or directly though the PSTN. The user can choose whether the P2P service or the PSTN should be used for the call. Alternatively, the user may set a preference as to which option should be used by default. The wireless handset can also detect certain specific numbers, and always call these through either the P2P service or the PSTN. For example, an emergency number (such as 911, 999 or 112) is detected and always called using the PSTN.

To call a PSTN number, the user selects a PSTN number in the contact list (this can be associated with a contact that only has PSTN numbers, or a contact that has both PSTN numbers and a P2P communication service username). Alternatively, the user can type the PSTN number into the keyboard manually (e.g. if the number is not associated with any contact).

If the PSTN number is to be called using the P2P service, then the wireless handset 302 sets up a DECT connection with the BS 304, transmitting the request to call the person listed in the contact list using the P2P service. The connection manager 440 in the BS 304 makes the call by transmitting data via the modem 206, across the Internet 110 to the gateway 120, where the data is are converted into a form suitable for transmission across the PSTN 122. The PSTN 122 delivers the converted data from the gateway 120 to the fixed-line telephone equipment 124 of the other user.

If the PSTN number is to be called directly using the PSTN, then the wireless handset 302 sets up a DECT connection with the BS 304, transmitting the request to call the person listed in the contact list using the PSTN. The connection manager 440 in the BS 304 establishes the call across the PSTN to the fixed-line telephone equipment 124 of the other user in a conventional manner.

Note that the user can also make calls to a mobile telephone via a mobile network (not illustrated in FIG. 3), instead of the PSTN, in a similar manner.

The user of the wireless handset 302 can also receive incoming calls from the PSTN. These calls can be incoming directly from the PSTN interface 410 of the BS 304 or from the P2P service via the Ethernet interface 408. In common with incoming calls from the P2P communication system, the call is received at the BS 304, which pages the wireless handset 302 and is indicated to the user by a ring-tone, the vibration of the device, or a combination of these (depending on user preferences). If CallerID information is available, then this is displayed on the UI. Again, the base station 304 and wireless handset 302 has the advantage that the call can be received without a PC needing to be present or activated.

As the P2P communication service operates on peer-to-peer principles, the number of central servers is kept to a minimum. In fact, the P2P communication service can function almost fully without using central servers. However, the functionality of the service can be improved through the use of some central servers. For example, a central contact server (308 FIG. 3) can be used to allow synchronization of the contact list for a user. When an existing P2P communication service user logs in on a new device (such as the wireless handset 302), the contact list for this user is retrieved from the central contact server 308. Once it has been retrieved from the contact server 308, the contact list is cached in the memory 412 of the base station 304 (and in some embodiments may be cached in the memory 436 of the wireless handset 302). Therefore, the contact list does not need to be retrieved every time the user logs in using the wireless handset 302. Note that, in reality, more than one contact server 308 would be present, for redundancy and scalability reasons. However, only a single server is shown in FIG. 3 for clarity.

In one or more embodiments, not all information for every contact needs to be stored on the contact server 308. Only usernames, the display name and the authorization status are required to be stored on the contact server 308. Other information such as the picture associated with a contact (known as the "avatar") is obtained from the P2P communication network. In alternative embodiments, all information could be centrally stored on the contact server.

The use of a central contact server 308 allows the user to log into the P2P communication service from a variety of devices and maintain a single unified contact list. For example, the user may use a PC at work and a wireless handset 302 at their home, and can get the same contact list on either of these devices. Furthermore, the user can also go to the home or workplace of a different user of the P2P communication service, and use the wireless handset of the different user to log into the network. The user will then have access to their own contact list, even though they are not the owner of the device accessing the network. The access to your own contact list on any device is a significant advantage over traditional PSTN and mobile telephones.

The user of the wireless handset 302 can use the UI and the keyboard of the device to search for the contact details of other users of the P2P communication service. The user is presented with a dialog box, in which they can enter details about a user they wish to search for (e.g. their full name or username). The wireless handset 302 then communicates with the BS 304 and retrieves this information from the network, and presents the results to the user in the UI. In effect, this allows the wireless handset 302 to have access to a directory of all the users of the P2P communication service directly from the device. This type of functionality is not available on PSTN and mobile telephones, and provides a substantial advantage to the user.

Once contacts have been found using the above-described search functionality, they can be added to the contact list directly from the wireless handset. Similarly, PSTN numbers can also be added to the contact list directly from the wireless handset. The user is also able to view profile information for users of the P2P communication service that have been found using the search or are in the user's contact list. The profile information contains details about the contact, which in some cases may include the contact's picture, which can be viewed on the wireless handset 302.

Other functionality implemented on the wireless handset 302 includes: call forwarding to another number; support for DTMF tones; access to voicemail (including leaving and retrieving messages, setting a custom greeting, and reverting back to a standard greeting); a call history distinguishing between missed, incoming and outgoing calls; participation in conference calls; access to account information; and the sending and approving of authorization requests for contacts. Call waiting is also implemented, such that an ongoing call can be placed on hold so that the user can answer another incoming call, and the user can flip back and forth between these calls. This includes the functionality to hold a call being made using the P2P service and swap to an incoming call on the PSTN line, and vice versa.

The UI of the wireless handset also provides notification of various events to the user. This includes network events such as incoming calls (through notification on the UI as well as ring-tones and vibration, as mentioned previously), notification of missed calls, and notification of voicemail messages. In addition, environmental events are handled and notified to the user, such as low battery alerts and wireless network signal strength.

All the software on the BS 304 (and in some embodiments the wireless handset 302) including the kernel and drivers can be updated via the Ethernet interface 408 using a PC and a specific application executed on the PC. In alternative embodiments, the BS 304 comprises an optional USB serial interface 414, which can be used to upgrade the software on the BS 304 and, in some embodiments, the wireless handset 302. Furthermore, certain aspects of the software may be updated directly over the Internet to the device, without the need to connect to a PC.

Figure 5:
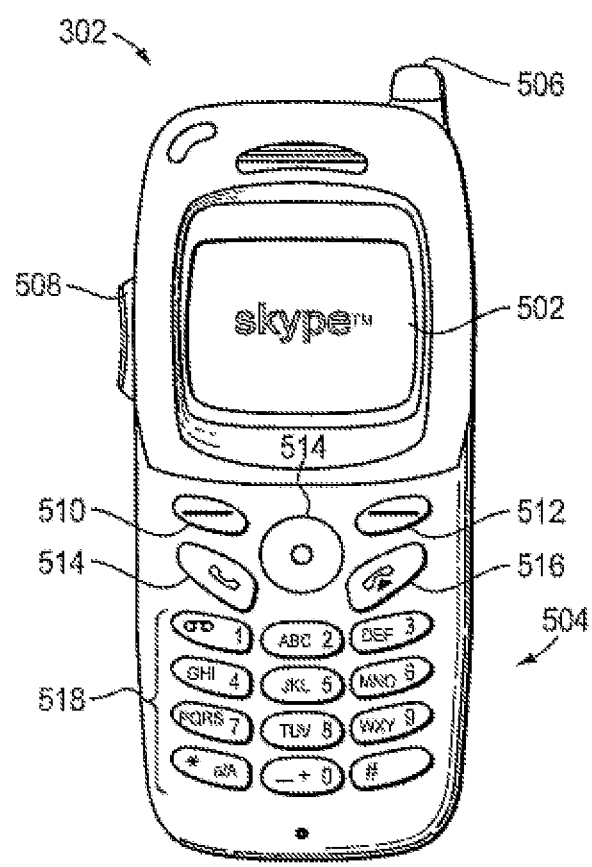
FIG. 5 shows the external controls of a dual-mode terminal wireless handset.

Reference is now made to FIG. 5, in which is shown an example of the external controls of the wireless handset 302. The front of the wireless handset 302 comprises a display 502 (such as an LCD) on which is displayed the UI. Below the display is a keyboard 504. In one or more embodiments, at the top of the device is a power button 506 and at the side of the device are volume up and volume down keys 508.

The keyboard 504 comprises a left soft key ("LSK") 510 which is used to invoke various specific actions that are shown in the UI on the display 502 directly above the LSK 510. In particular, the LSK 510 is used for "positive" actions such as "Options" and "Select". A right soft key ("RSK") 512 is also present that invokes actions shown in the UI on the display 502 directly above the RSK 510. In particular, the RSK 512 is used for "negative" actions such as "Back" and "Clear".

Between the two soft keys is located a navigation pad 514. The navigation pad can be moved up, down, left and right by the user to navigate through the menu system and move a cursor for text entry. The center of the navigation pad 514 can be depressed by the user to invoke a selection. A send key 514 is present which is used to initiate a call. This key is typically colored green. An end key 516 is present that, during an active call, ends the call, and, during an incoming call, rejects the call. This key is typically colored red. The end key 516 is also used to clear the content of a dialog box, and closes the dialog and returns the user to a main idle screen of the UI with subsequent presses. Elsewhere in the UI a single press of the end key 516 returns the user to the idle screen. If device does not include a power key, the power menu can be presented on the end key 516. For example, a press of the end key 516 for <1.5 seconds would perform the end key actions described above, a press of 1.5 to 4 seconds displays a power menu, and a press of >4 seconds switches off the device.

An alphanumeric keypad 518 is located at the bottom of the front face of the wireless handset. This is of a similar configuration to that found on a traditional cordless telephone. However, in one or more embodiments, the labelling of the keypad is adapted to the function of the wireless handset. In particular, because the P2P communication system operates largely on names, rather than numbers, the alphanumeric keys are labelled with the letter more prominent than the numbers, whereas with traditional telephones the opposite is true.

The alphanumeric keypad 518 is used for text entry, such as adding or searching contacts. It is also used for number entry, such as adding and dialing PSTN numbers. In particular, the keys of the keyboard are multifunctional, such that a single key represents a number of different characters. Different characters associated with a particular key may be accessed depending on the number of key presses of the key. Some of the keys may also be used for other features depending on the UI context in which they are used. For example, the "1" key can be used to access voicemail with a long press, the "0" key can be used to enter a space, the "*" key can be used to change text entry modes, and the "#" key can be used to enter language symbols.

Figure 6:
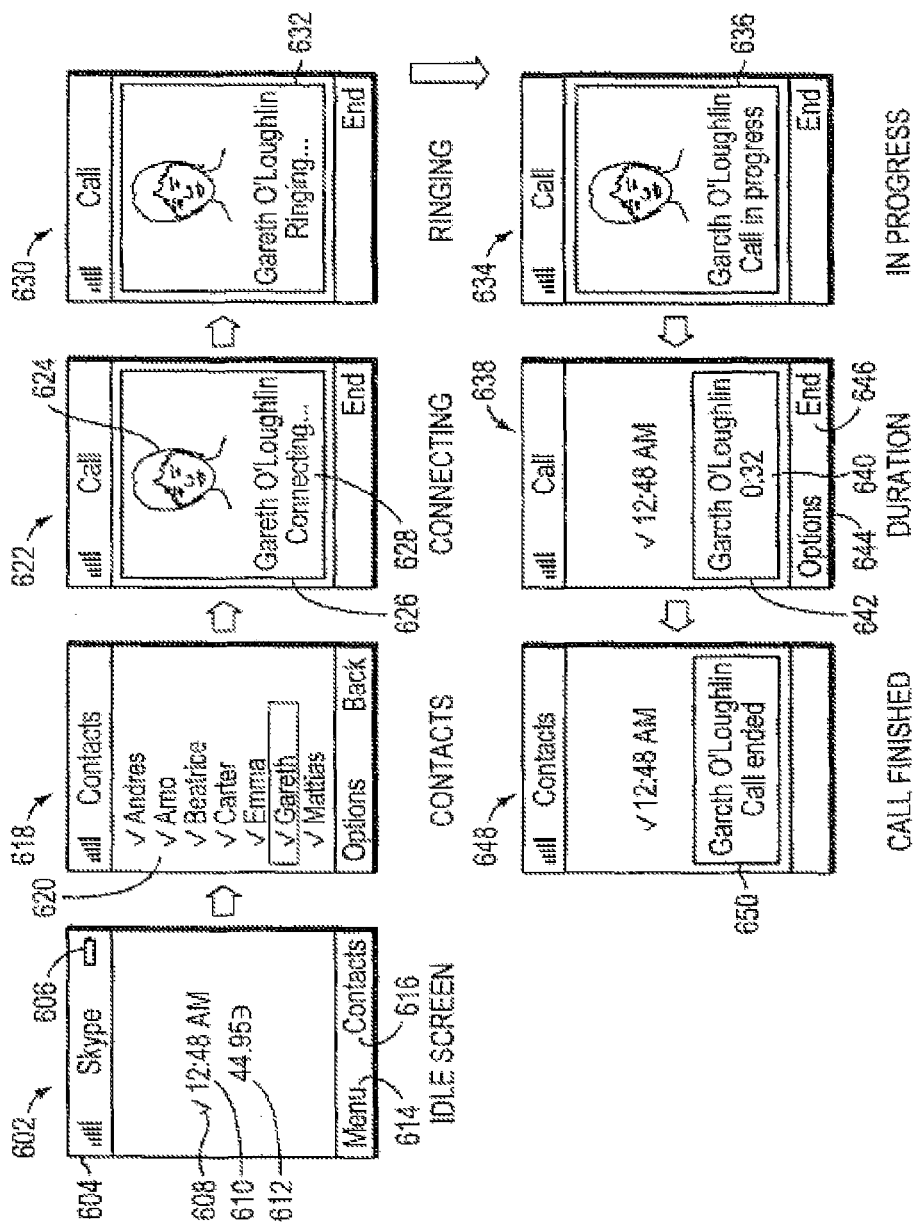
FIG. 6 shows a user interface when making an outgoing call to another user of the P2P communication service.

Reference is now made to FIGS. 6 to 9, in which are illustrated examples of the user interface as different common operations are performed using the wireless handset. Referring first to FIG. 6, this figure shows a user making an outgoing call to another user of the P2P communication service, for example between the wireless handset 302 and computer terminal 112 in FIG. 3. The UI screen shown in 602 illustrates the main idle screen of the wireless handset. This screen shows the wireless connection signal strength 604, the level of battery charge 606, the user's current presence status (indicated by icon 608), the current time 610, and the amount of credit on the user's account 612. At the bottom of the display are shown the labels for the soft keys LSK 510 and RSK 512. The label 614 shows that if the LSK 510 is selected, the user is presented with a "Menu" screen. The label 616 shows that if the RSK 512 is selected, the user is presented with a "Contacts" screen.

The UI screen shown in 618 illustrates the contacts UI display that the user is shown when the RSK 512 is selected in screen 602. Screen 618 shows a list of contacts that the user has stored on the device (these may also have been retrieved from the contact server as described previously). Each of the contacts has a name, and in this example they are all other users of the P2P communication service, as indicated by the icon 620 next to the name. The icon 620 indicates the presence status of the contact to the user. For example, the icon may indicate that the contact is online, offline, away, busy ("do not disturb") or any other suitable status. The LSK 510 takes the user to an "Options" screen (described hereinafter) and the RSK 512 takes the user back to the main idle screen.

The user can use the navigation pad 514 to scroll though the list of names. When the user selects one of the names the wireless handset initiates a P2P communication service call to the selected user.

The screen 622 shows the UI display when the call to the selected contact is initiated. The screen 622 shows the picture 624 of the person being called, their name 626, and the message "Connecting . . . " 628. The user can end the call at this stage by selecting the RSK 512, or by using the end key 516. The screen 630 shows the UI display when the call has been connected, and is ringing at the terminal of the contact. This displays the same information as screen 622, except the message now shows "Ringing . . . " 632.

When the called person picks up and the call is connected, the screen shown in 634 is displayed. This screen shows the same information as screen 630, except that the message now reads "Call in progress" 636. The screen 634 is only displayed temporarily, typically for a few seconds, and then the screen 638 is displayed. Screen 638 displays the duration 640 of the ongoing call and the name of the called person 642. The label for the LSK 510 is "Options" 644, and by pressing the LSK 510, the user is presented with options for handling the ongoing call, such as putting the call on hold or muting the microphone.

The call is ended by pressing the end key 516 or my pressing the RSK 512, labelled "End" 646. When the call is ended the screen 648 is displayed for a few seconds. This shows the same information as screen 638, except that the duration is replaced by the message "Call ended" 650. The UI then reverts to the main idle screen 602.

Figure 7:
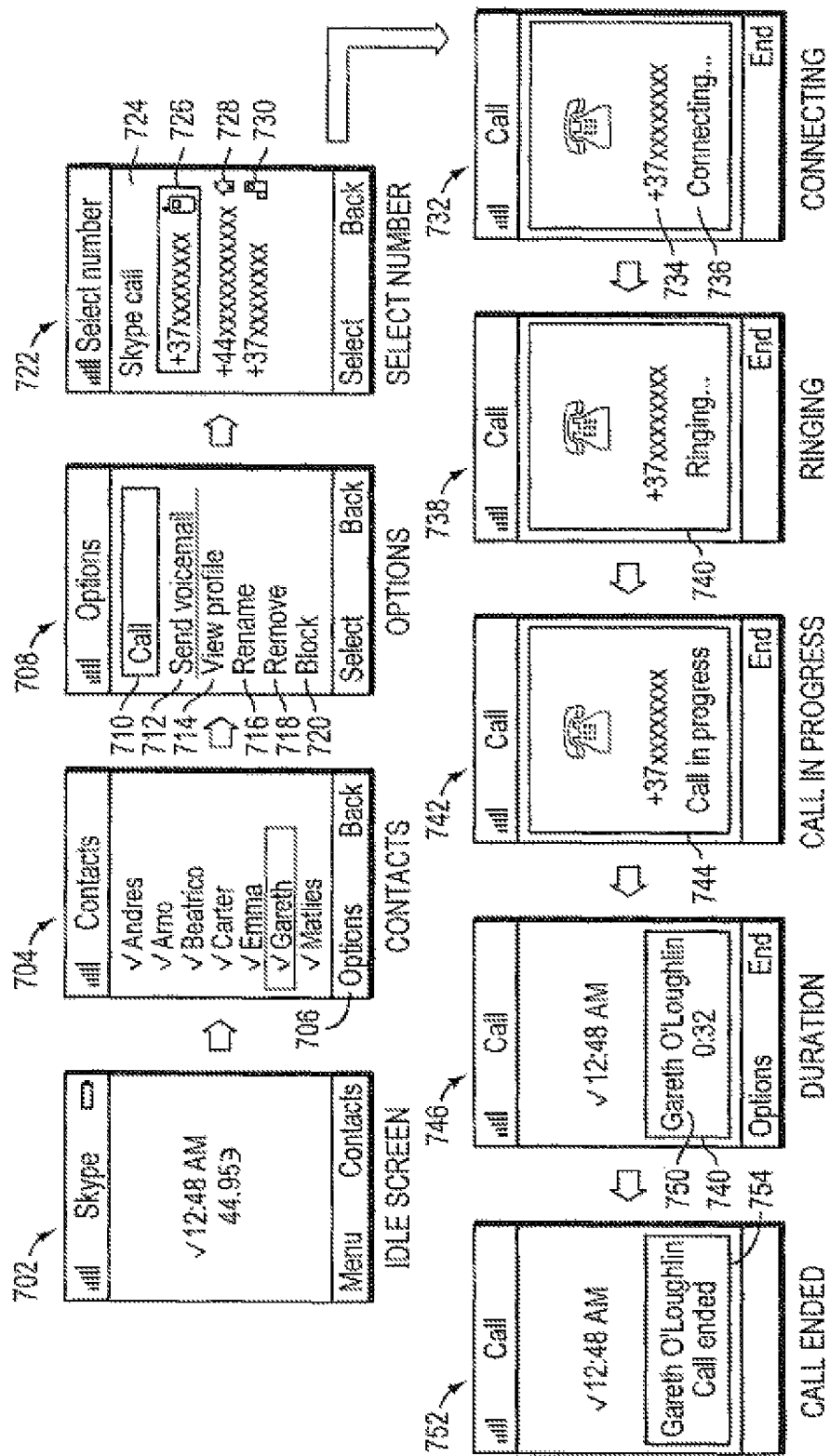
FIG. 7 shows a user interface when making an outgoing call to a public switched telephone network (PSTN) number.

Reference is now made to FIG. 7, in which is shown the UI displays for a user making an outgoing call to a PSTN number, for example between the wireless handset 302 and fixed-line telephone 124 in FIG. 3 (either using the P2P service or directly via the PSTN, depending on user preferences, as discussed previously). The first two screens 702 and 704 are identical to those shown in 602 and 618 in FIG. 6 (and described above). However, in screen 704, when the desired contact is selected the LSK 510 with the label "Options" is pressed (rather than depressing the center of the navigation pad 514 as was done with FIG. 6). The user is then displayed screen 708, which shows several options for the selected contact. The user can select to call the contact (710), send a voicemail to the contact (712), view the profile of the contact (714), rename the contact (716), remove the contact from the contact list (718), and block the contact from calling the user (720).

In this example, the user selects the option to call the contact (710), and is presented with screen 722. Screen 722 lists the different methods of communicating with the contact that the user has stored on the device. The screen 722 shows that the contact can be called using the P2P communication service ("Skype call" 724), using a mobile telephone number 726, using a home PSTN number 728 and using an office PSTN number 730. The icons next to the numbers indicate their category (mobile, home, office etc.). Some contacts can, of course, have greater or fewer entries for different ways of contacting the person. In the example shown in FIG. 7, the user selects to call the mobile number 726 of the contact, by depressing the center of the navigation pad 514 or pressing the LSK 510.

When the call to the selected number is being connected, the user is displayed screen 732, which shows the number being called 734 and the message "Connecting . . . " 736. When the telephone of the called person is ringing, the user is shown screen 738, which is identical to the previous screen, except that the message now states "Ringing . . . " 740. When the call is answered, screen 742 is displayed. This screen is identical to the previous screen, except that the message reads "Call in progress" 744.

Screen 742 is only displayed for a few seconds, and the user is then displayed screen 746. This screen shows the duration of the call 748 and the name of the contact 750, and is displayed until the call is ended. When the call is ended screen 752 is displayed for a few seconds. This shows the same information as screen 746, except that the duration is replaced by the message "Call ended" 754. The UI then reverts to the main idle screen 702.

Figure 8:
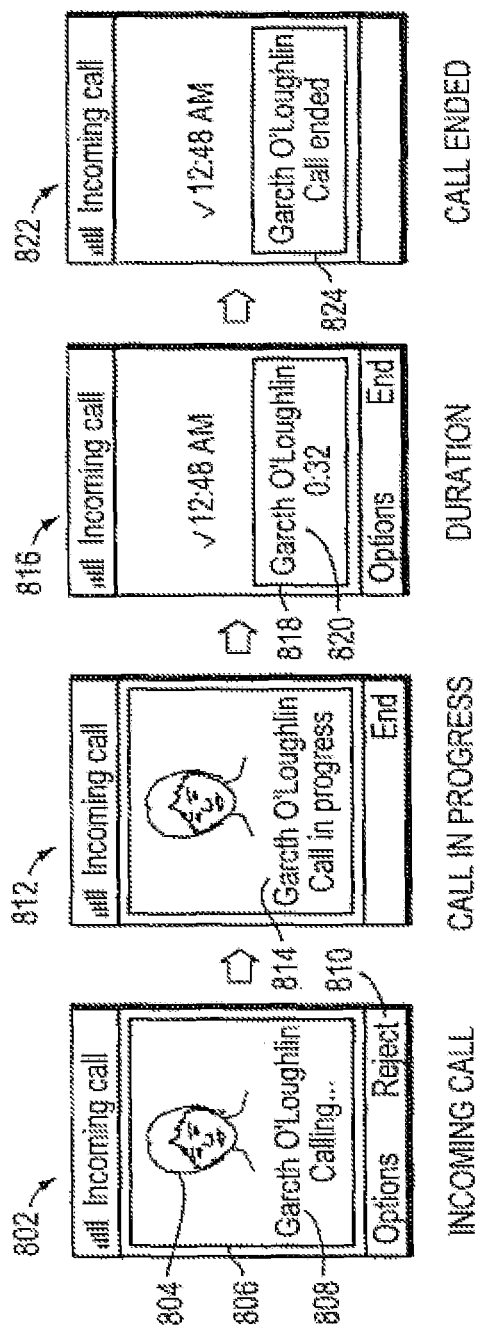
FIG. 8 shows a user interface when receiving an incoming call from another user of the P2P communication service.

Reference is now made to FIG. 8, which illustrates a user receiving an incoming call from another user of the P2P communication service, for example from computer terminal 112 to the wireless handset 302 in FIG. 3. When the incoming call is received at the wireless handset 302, the screen 802 is displayed (and the device rings/vibrates, as mentioned previously). Screen 802 displays the picture of the contact 804, the name of the contact 806 and the message "Calling" 808. The user can reject the incoming call using the end key 516 or the RSK 512, for which the label "Reject" 810 is displayed.

If the user accepts the call using the send key 514, the screen 812 is displayed. This screen is similar to the previous screen except that the message now reads "Call in progress" 814. Screen 812 is only displayed for a few seconds, before screen 816 is displayed. Screen 816 shows the name 818 of the caller and the duration of the incoming call 820. When the call ends, the user is shown screen 822 for a few seconds. This screen is similar to the previous screen, except that the duration is replaced by the message "Call ended" 824.

Figure 9:
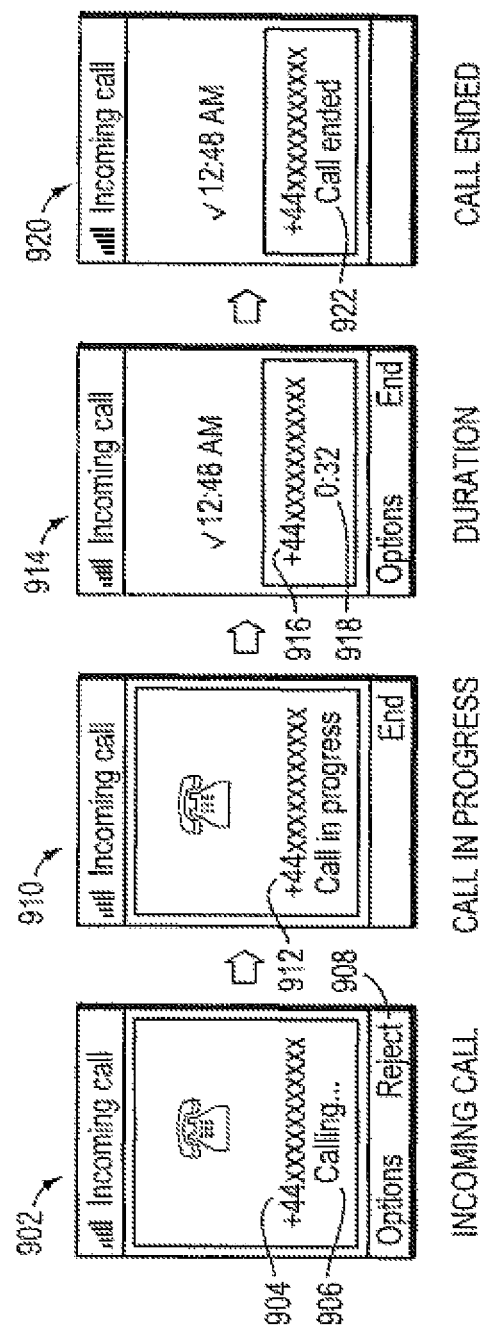
FIG. 9 shows a user interface when receiving an incoming call from the PSTN.

Reference is now made to FIG. 9, which illustrates a user receiving an incoming call from the PSTN, for example from fixed-line telephone 124 to the wireless handset 302 in FIG. 3. When the incoming call is received at the wireless handset 302, the screen 902 is displayed (and the device rings/vibrates, as mentioned previously). Screen 902 displays the telephone number 904 of the personal calling and the message "Calling" 906. The user can reject the incoming call using the end key 516 or the RSK 512, for which the label "Reject" 908 is displayed.

If the user accepts the call using the send key 514, the screen 910 is displayed. This screen is similar to the previous screen except that the message now reads "Call in progress" 912. Screen 910 is only displayed for a few seconds, before screen 914 is displayed, which shows the telephone number 916 of the caller and the duration of the incoming call 918. When the call ends, the user is shown screen 920 for a few seconds. This screen is similar to the previous screen, except that the duration is replaced by the message "Call ended" 922.

Figure 10B:
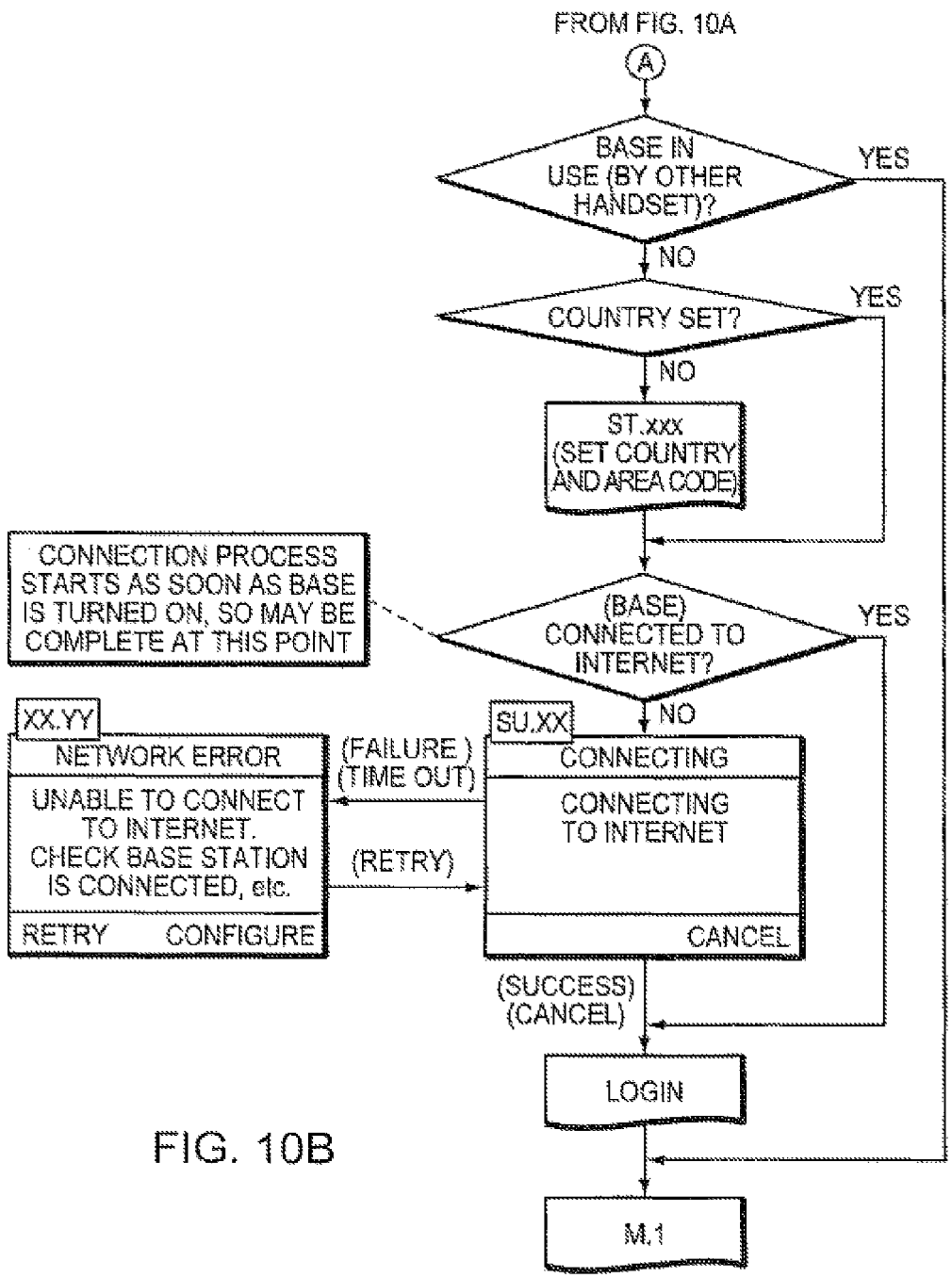
FIG. 10 shows the user interface screen flow for the wireless handset startup procedure.
Figure 11B:
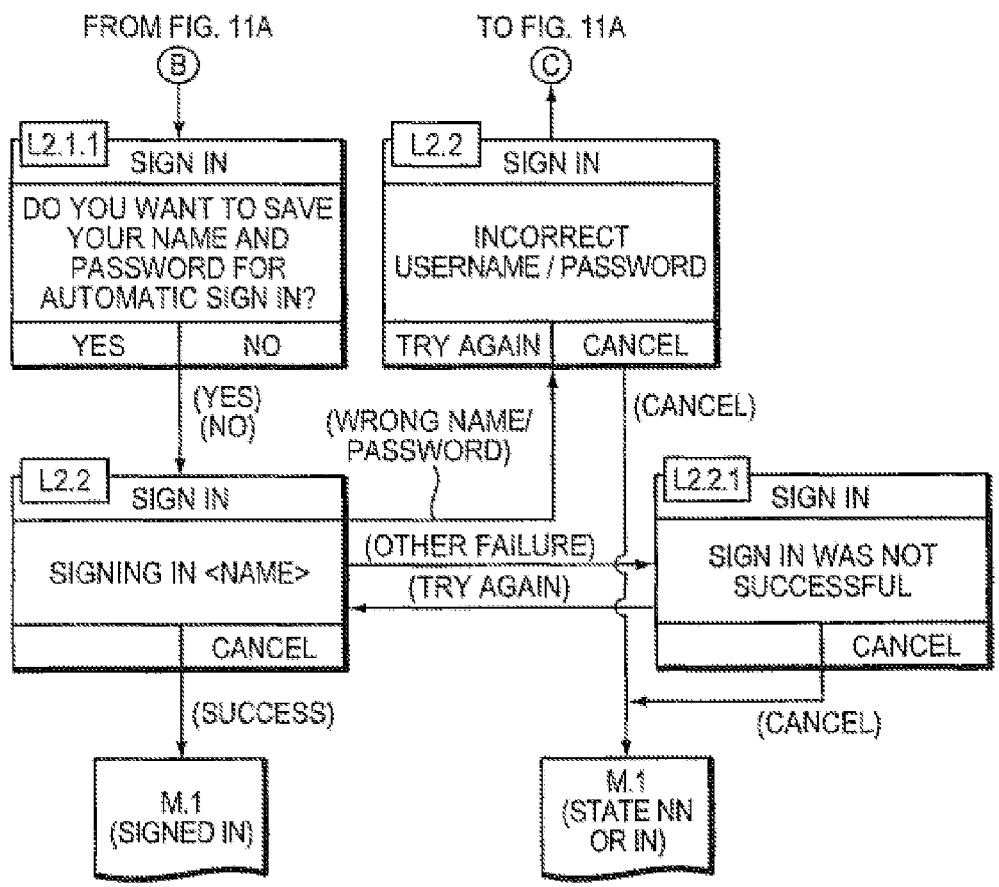
FIG. 11 shows the user interface screen flow for the procedure to log-in to the wireless handset.
Figure 12B:
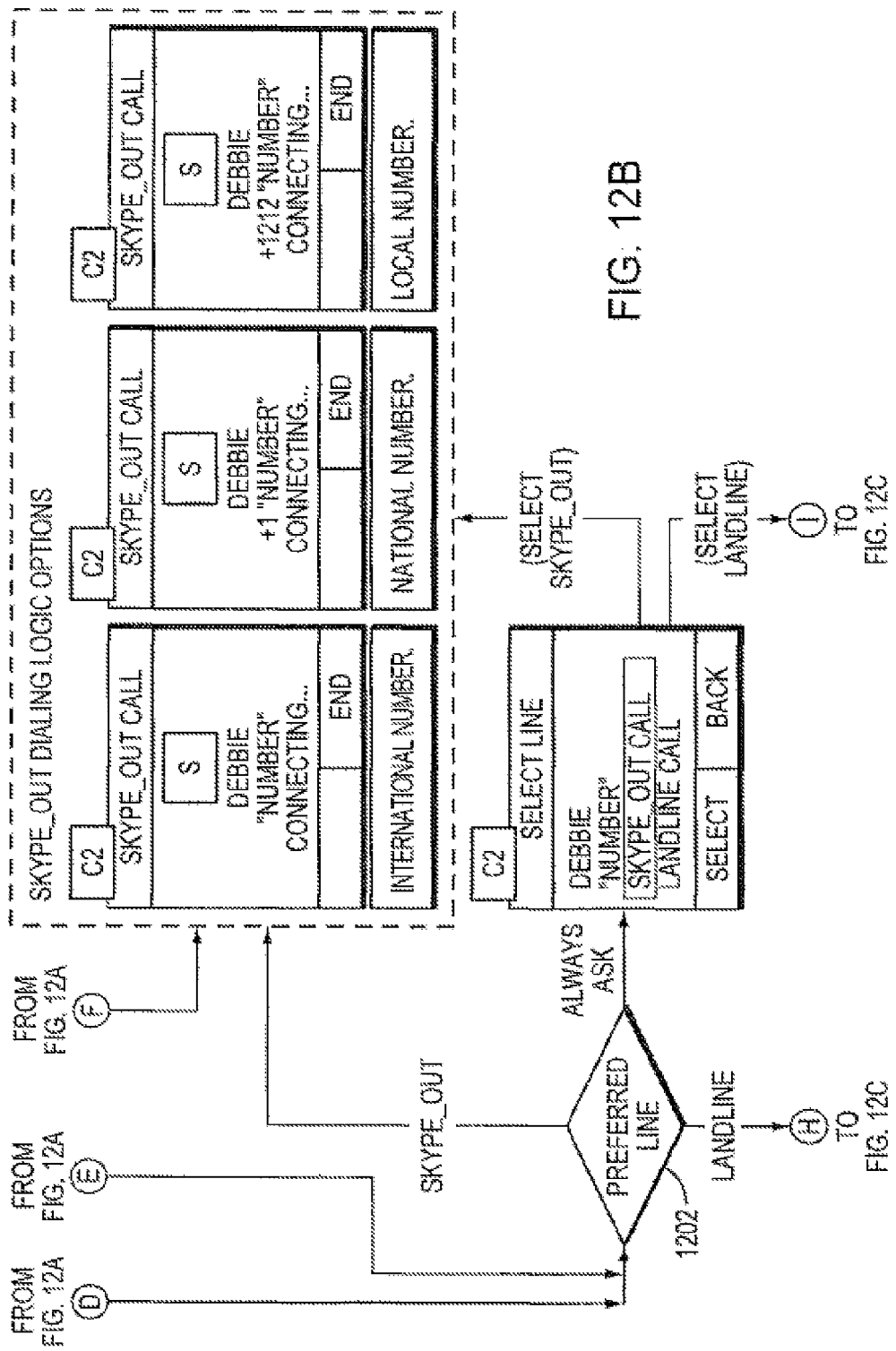
FIG. 12 shows the user interface screen flow for making an outgoing call from the wireless handset.
Figure 12C:
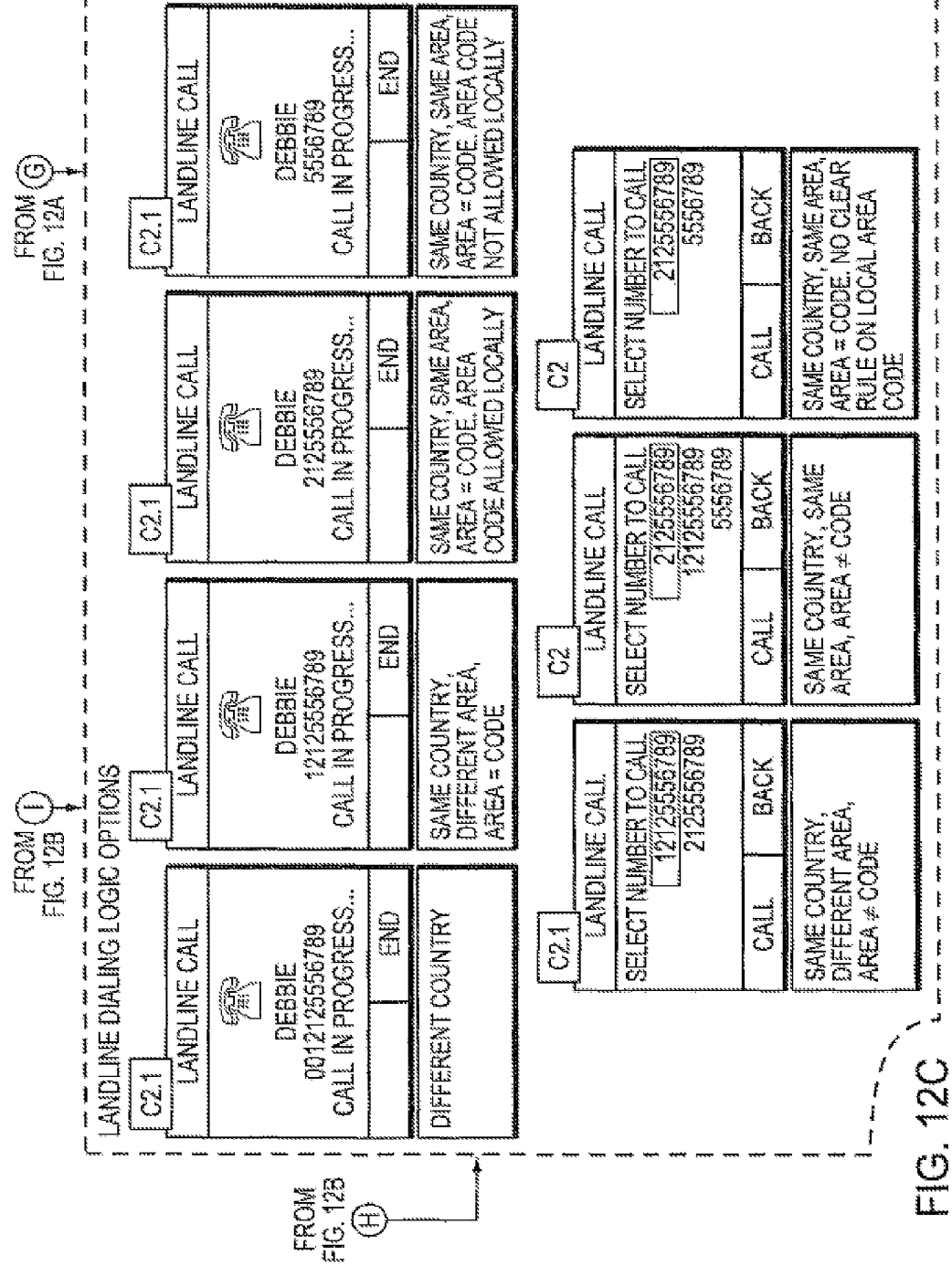

Reference is now made to FIGS. 10 to 18, which illustrate in more detail the UI screen flows. FIG. 10 illustrates the UI screen flow for the wireless handset start-up procedure (i.e. following the powering on of the device). FIG. 11 illustrates the detailed UI screen flows for the procedure to log-in to the wireless handset using the P2P service username and password, or create a new account. FIG. 12 illustrates the detailed UI screen flows for making an outgoing call from the wireless handset. Of note in FIG. 12 is the decision labelled 1202, where the handset decides the preferred line to use to call a PSTN number: the P2P service, the direct PSTN connection, or a selection by the user.

Figure 13:
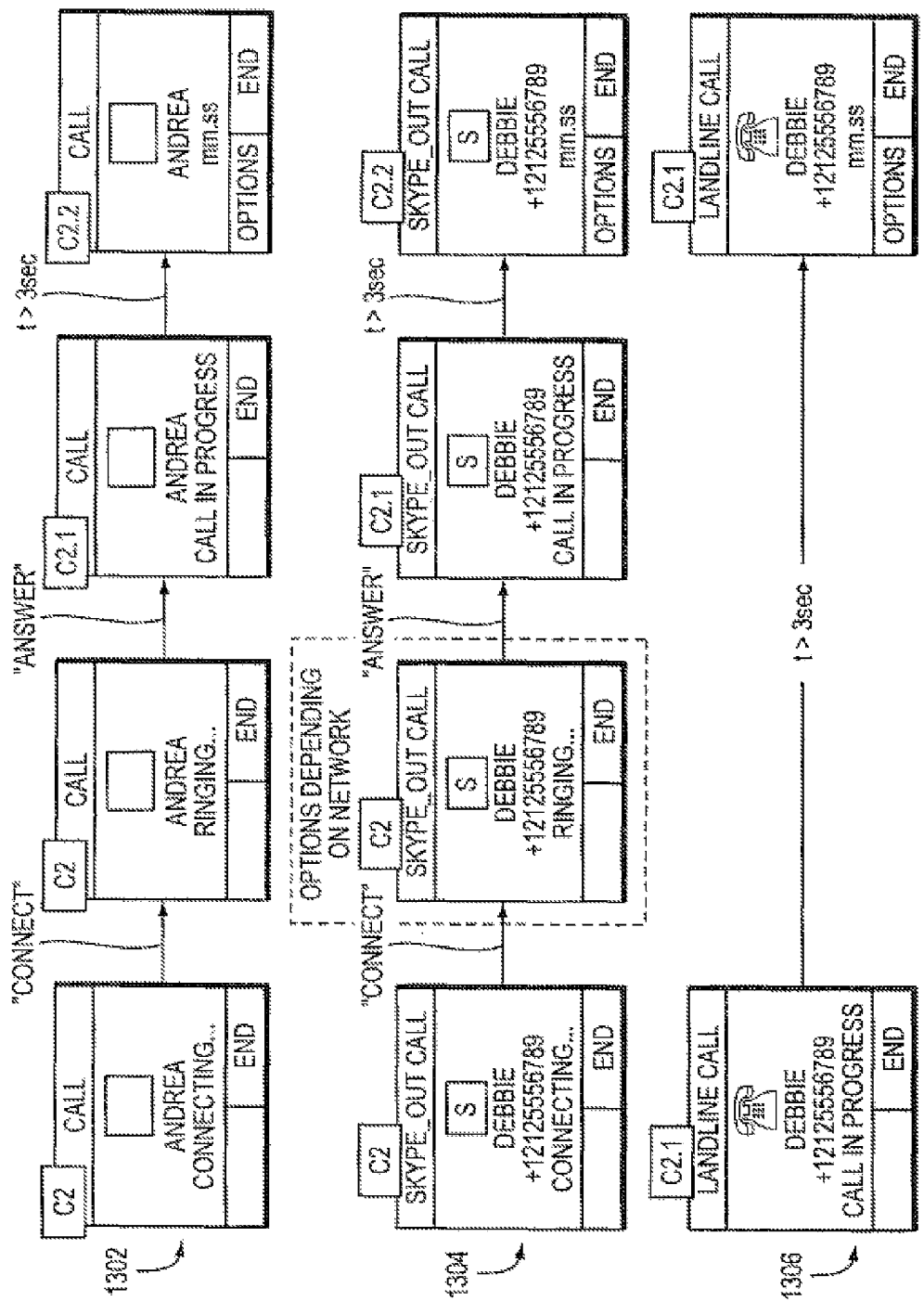
FIG. 13 shows the user interface screen flow for the procedure for connecting a call.

FIG. 13 illustrates the detailed UI screen flows for the procedure for connecting a call. The procedure for connecting a call to a user of the P2P service is shown in 1302. The procedure for connecting a call to a PSTN number using the P2P service is shown in 1304. The procedure for connecting a call to a PSTN number using the PSTN line from the BS 304 is shown in 1306.

FIG. 14 illustrates screens that are displayed when exceptions to outgoing calls are raised. 1402 shows an exception raised when an incorrectly formatted PSTN number is entered (e.g. due to an incorrect number of digits). 1404 shows an exception raised when an outgoing call is attempted using the PSTN connection, but this is already in use (for example if another fixed-line telephone is connected and being used). 1406 show the case where an emergency number is recognized, and the PSTN connection is automatically selected.

Figure 15B:
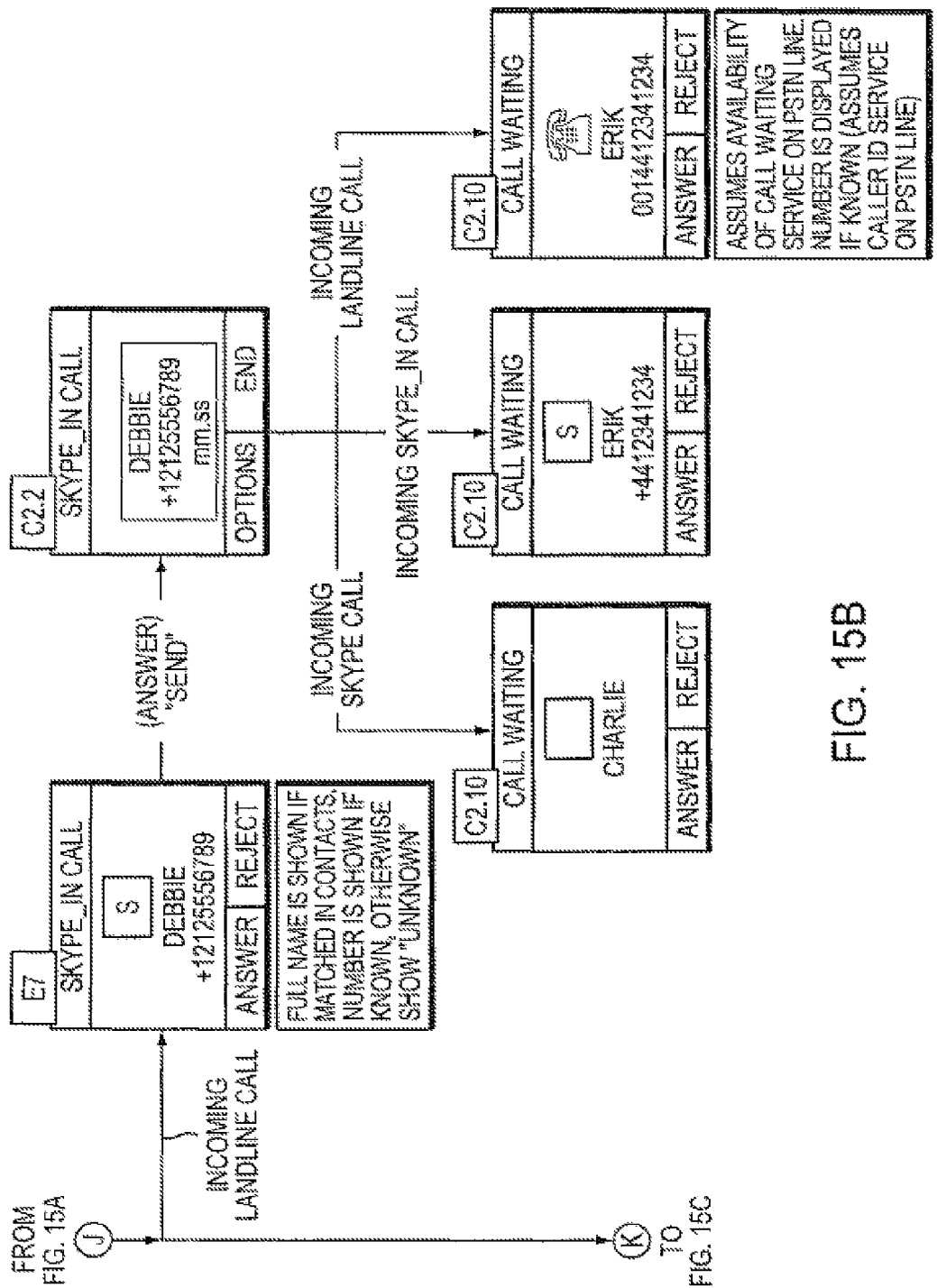
FIG. 15 shows the user interface screen flow for incoming calls received at the wireless handset.
Figure 15C:
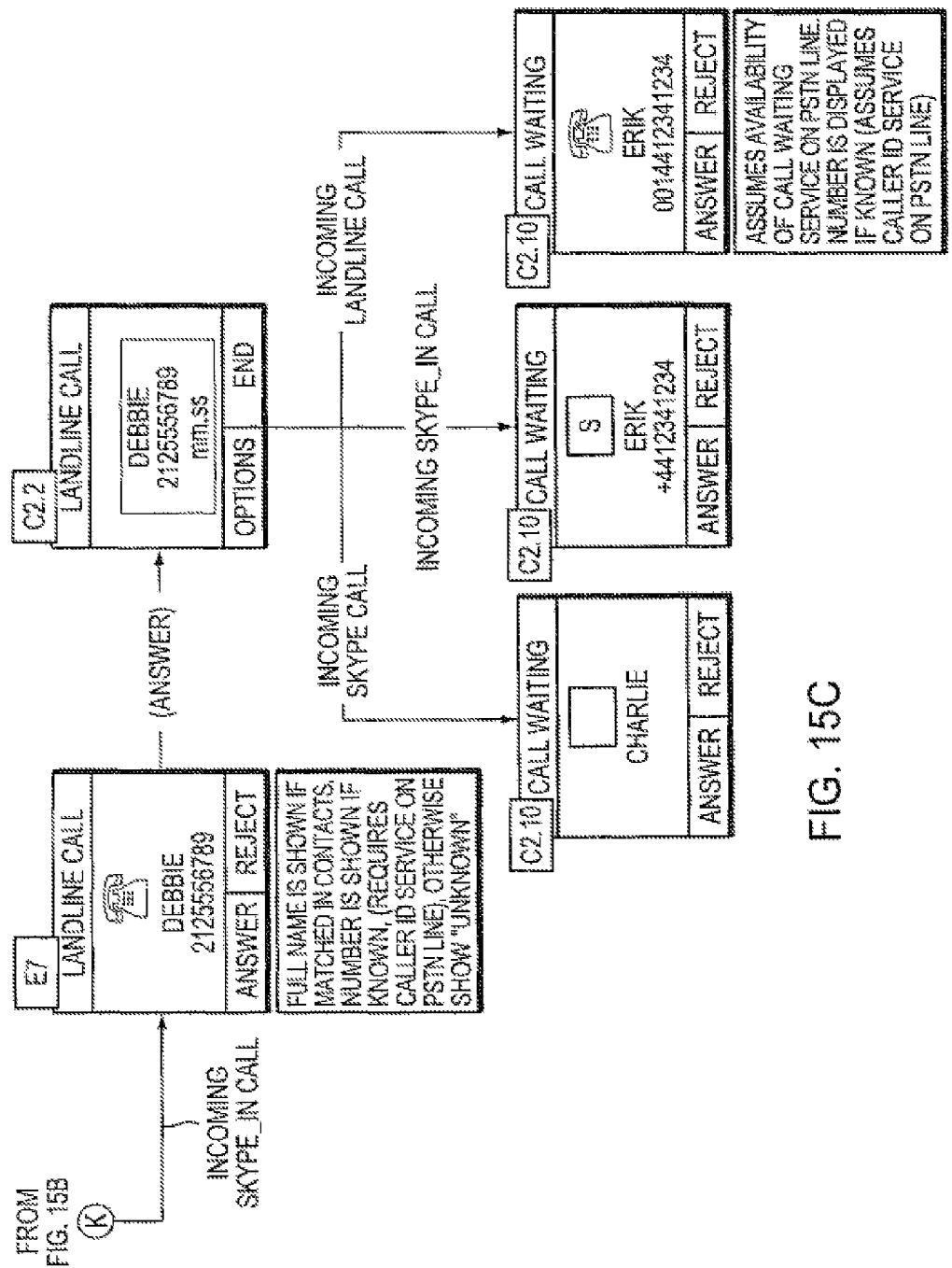
Figure 16B:
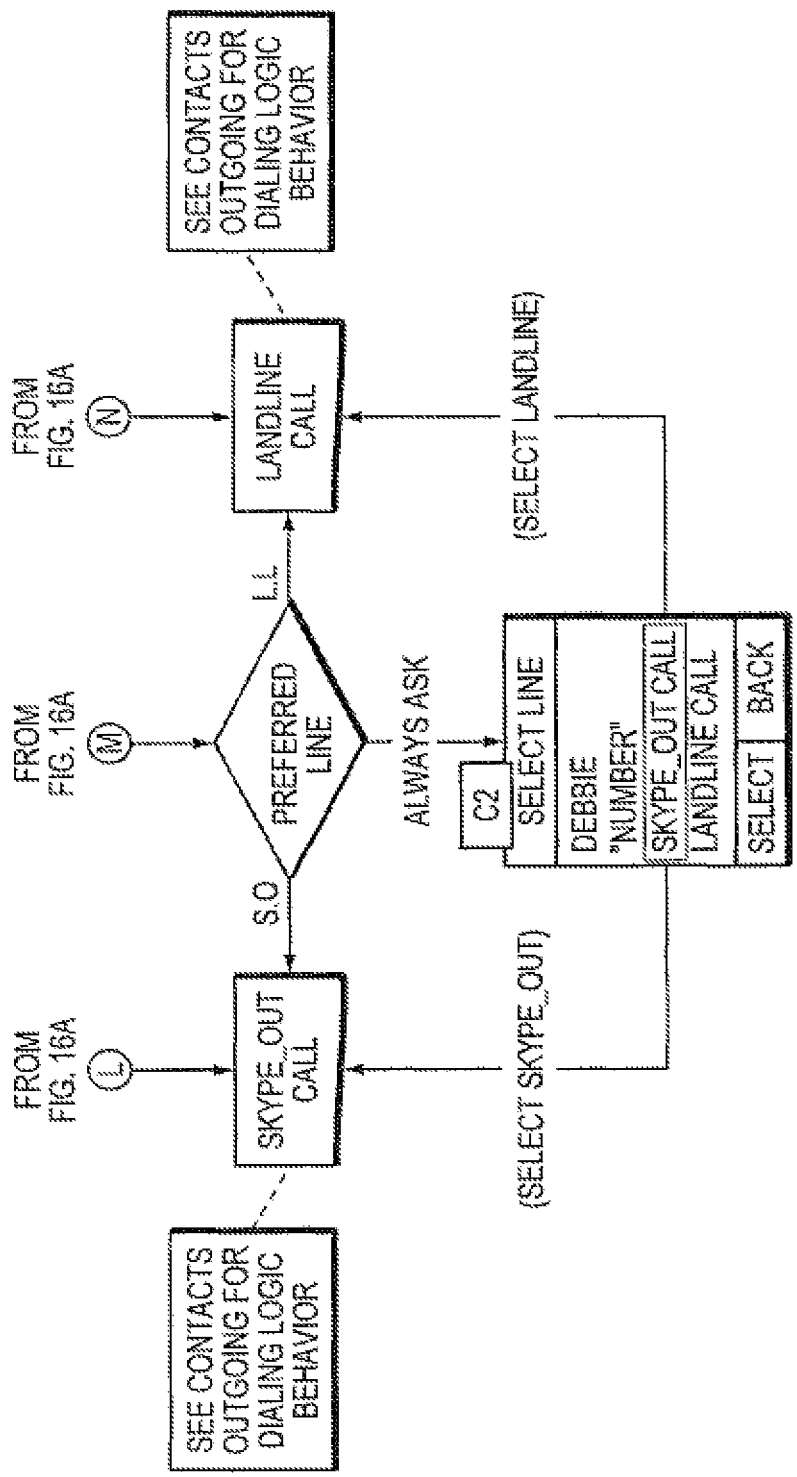
FIG. 16 the user interface screen flow for selecting and dialing contacts from the contact list.
Figure 17B:
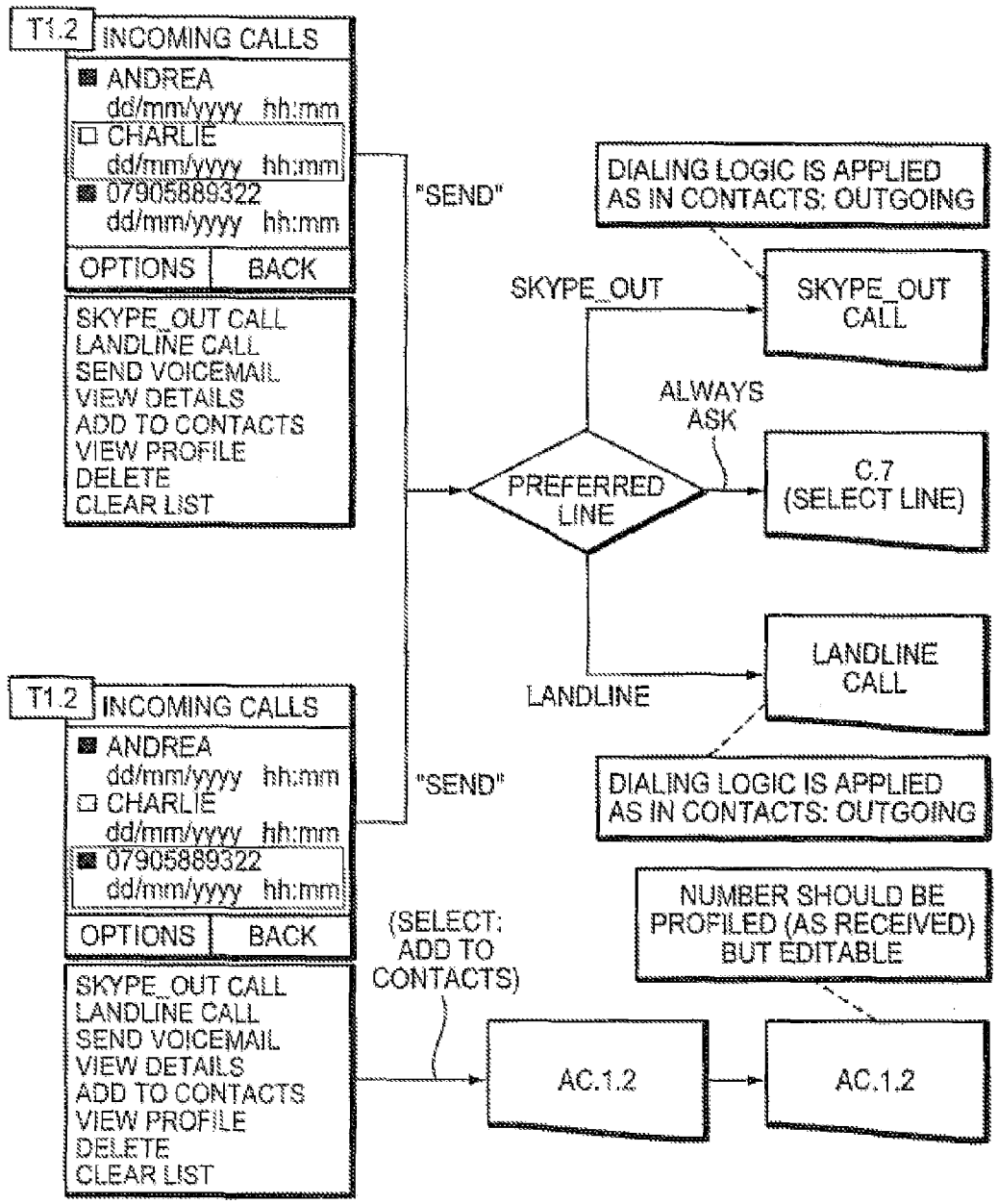
FIG. 17 shows the user interface screen flow for viewing and utilizing information from the incoming calls history.
Figure 18B:
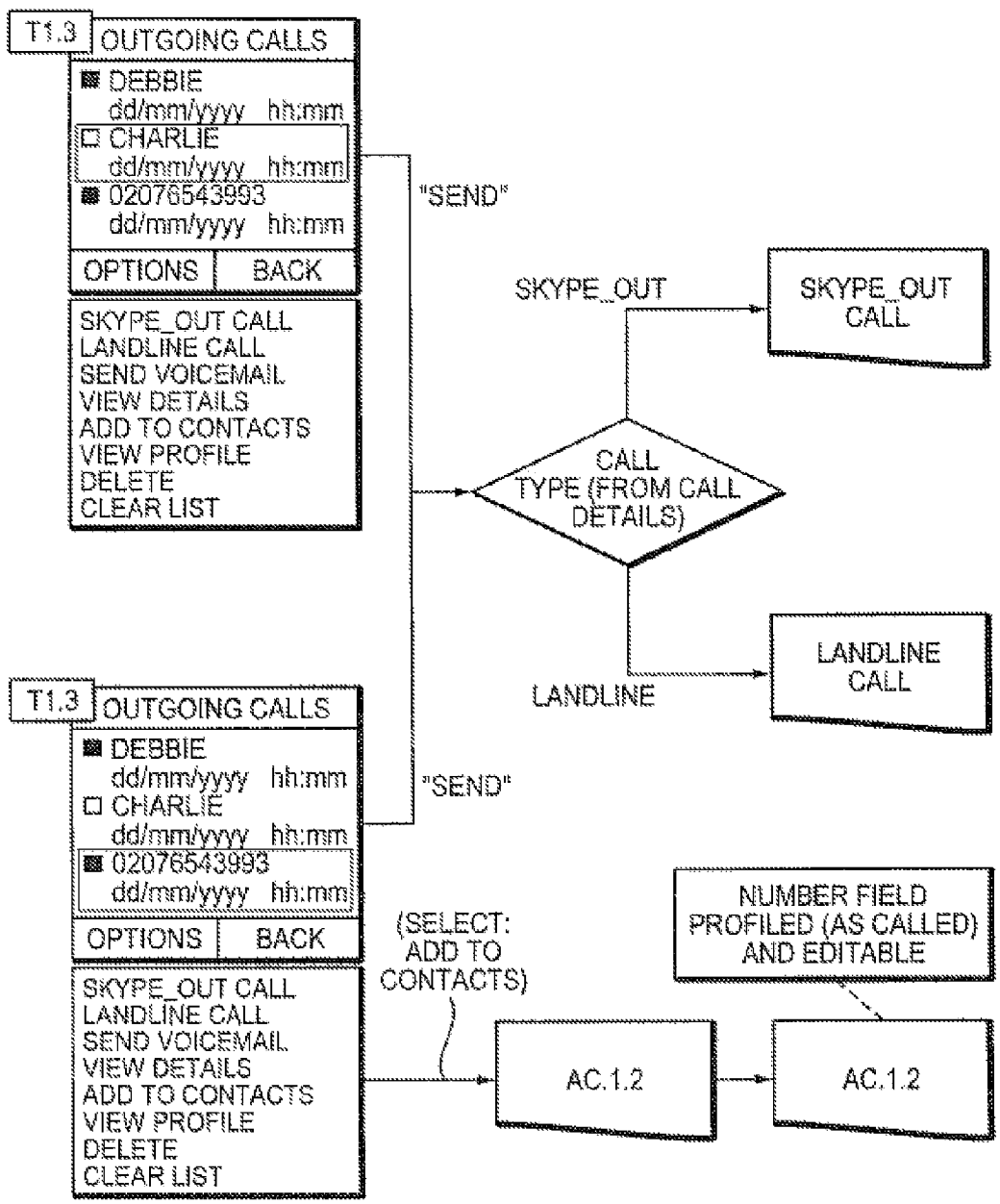
FIG. 18 shows the user interface screen flow for viewing and utilizing information from the outgoing calls history.

FIG. 15 illustrates the detailed UI screen flow for incoming calls received at the wireless handset and the call waiting options. FIG. 16 shows the detailed UI screen flow for selecting and dialing contacts from the contact list. FIG. 17 shows the detailed UI screen flow for viewing and utilizing information from the incoming calls history and FIG. 18 shows the detailed UI screen flow for viewing and utilizing information from the outgoing calls history.

The above-described dual-mode terminal comprising a base station 304 and wireless handset 302 therefore provides a solution to the problem of enabling VoIP calls over a P2P communication service, without the requirement to have a PC present and powered on, whilst not requiring a fixed-line telephone for emergency calls. The wireless handset 302 also gives the user mobility within the coverage area of the BS 304. It should be noted, however, that in common with traditional cordless PSTN phones the base station needs to be powered in order to operate, and therefore the cordless phone is inoperative during a power cut situation. Therefore, the dual-mode terminal is not designed to be used for making emergency calls during power failures, and alternative arrangements should be in place for making emergency calls in such circumstances.

In addition, the dual-mode terminal provides further advantages over traditional PSTN and mobile telephones. For example, the user of the wireless handset can search for other users of the P2P communication service using the wireless handset, effectively giving them access to a full directory direct from the handset. The user can also log into and use a wireless handset of a different user and gain access to their personal contact list downloaded from a contact server in the network. Furthermore, multiple wireless handsets can communicate with a single BS at a single premises, and the two P2P and 25 PSTN lines can be used for calls simultaneously by different handsets.

While this invention has been particularly shown and described with reference to one or more embodiments, it will be understood to those skilled in the art that various changes in form and detail may be made without departing from the scope of the invention as defined by the appendant claims.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for establishing a communication session, the method comprising:

establishing, at a base station, a wireless connection with a handset;

receiving, at the base station, a request, from the handset, to initiate the communication session with a selected contact;

accessing a set of user preferences mapping two or more groups of particular types of contacts to one of a packet data network or a public switched telephone network; and selectively establishing the communication session between the base station and the selected contact over one of the packet data network or the public switched telephone network, the selectively establishing further comprising establishing the communication session over the packet data network or the public telephone network based on whether the selected contact comprises the particular type of contact mapped to the packet data network or the particular type of contact mapped to the public switched telephone network.

2. The method of claim 1, wherein the communication session is established between the base station and a device associated with the selected contact.

3. The method of claim 1, wherein the receiving a request further comprises receiving a selection of the selected contact from a contact database at the base station or the handset.

4. The method of claim 1, wherein the receiving a request further comprises receiving a selection of the selected contact from a contact database at the handset.

5. A handset comprising: a display; and at least a memory and a processor configured to implement operations comprising: establishing a wireless connection with a base station; rendering, on the display of the handset, a user interface for selecting contacts; receiving a selection of a contact via the user interface; and communicating the selected contact to the base station effective to cause the base station to establish a communication session with the selected contact over one of a packet data network or a public switched telephone network based at least in part on user preferences mapping two or more groups of particular types of contacts to one of a packet data network or a public switched telephone network, the packet data network or the public switched telephone network selected based on whether the selected contact comprises the particular type of contact mapped to the packet data network or the particular type of contact mapped to the public switched telephone network.

6. The handset of claim 5, wherein the first communication network comprises a packet data network.

7. The handset of claim 5, wherein the second communication network comprises public switched telephone network.

8. The computing device of claim 5, wherein the communication session is established between the base station and a device associated with the selected contact.

9. The handset of claim 5, wherein the user interface displays contacts from a contact database.

10. The handset of claim 9, wherein the contact database is stored at the computing device.

11. The handset of claim 9, wherein the contact database is stored at the base station.

12. A method for establishing a communication session, the method comprising: establishing, at a handset, a wireless connection with a base station; rendering, at the handset, a user interface for selecting contacts; receiving a selection of a contact via the user interface; and communicating the selected contact to the base station effective to cause the base station to establish the communication session with the selected contact over one of a packet data network or a public switched telephone network based at least in part on user preferences mapping two or more groups of particular types of contacts to one of a packet data network or a public switched telephone network, the packet data network or the public switched telephone network selected based on whether the selected contact comprises the particular type of contact mapped to the packet data network or the particular type of contact mapped to the public switched telephone network.

13. The method of claim 12, wherein the first communication network comprises a packet data network, and wherein the second communication network comprises public switched telephone network.

14. The method of claim 12, wherein the communication session is established between the base station and a device associated with the selected contact.

15. The method of claim 12, wherein the user interface displays contacts from a contact database.

16. The method of claim 15, wherein the contact database is stored at the handset.

17. The method of claim 15, wherein the contact database is stored at the base station.

* * * * *